United States Patent
Ishida et al.

(10) Patent No.: US 8,446,444 B2
(45) Date of Patent: May 21, 2013

(54) OPTICAL SCANNING DEVICE AND IMAGE FORMING APPARATUS

(75) Inventors: Masaaki Ishida, Kanagawa (JP); Yasuhiro Nihei, Kanagawa (JP); Atsufumi Omori, Kanagawa (JP); Dan Ozasa, Kanagawa (JP); Jun Tanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 697 days.

(21) Appl. No.: 12/358,867

(22) Filed: Jan. 23, 2009

(65) Prior Publication Data
US 2009/0195635 A1 Aug. 6, 2009

(30) Foreign Application Priority Data

Feb. 6, 2008 (JP) ................................ 2008-025842

(51) Int. Cl.
*B41J 2/435* (2006.01)
*B41J 2/455* (2006.01)
*B41J 2/47* (2006.01)

(52) U.S. Cl.
USPC ........... 347/236; 347/233; 347/234; 347/235; 347/237; 347/246; 347/247

(58) Field of Classification Search
USPC .......................... 347/235, 236, 233, 237, 247
See application file for complete search history.

(56) References Cited

U.S. PATENT DOCUMENTS

| 4,933,549 A * | 6/1990 | Fujioka et al. ............. 250/235 |
| 6,404,448 B1 * | 6/2002 | Toda .............................. 346/116 |
| 6,466,243 B2 * | 10/2002 | Takahashi ..................... 347/116 |
| 6,570,675 B1 * | 5/2003 | Asada ........................... 358/1.7 |
| 6,603,498 B1 * | 8/2003 | Konnunaho et al. .......... 347/236 |
| 6,791,596 B2 | 9/2004 | Nihei et al. |
| 6,882,454 B2 * | 4/2005 | Inukai ......................... 359/204.2 |
| 6,927,789 B2 | 8/2005 | Ozasa et al. |
| 6,933,957 B2 | 8/2005 | Omori et al. |
| 7,119,825 B2 * | 10/2006 | Vazan ............................ 347/236 |
| 7,212,224 B2 | 5/2007 | Nihei et a |
| 7,256,815 B2 | 8/2007 | Suzuki et al. |
| 7,271,824 B2 | 9/2007 | Omori et al. |
| 7,283,151 B2 | 10/2007 | Nihei et al. |
| 7,294,824 B2 * | 11/2007 | Maeda .......................... 250/234 |
| 7,327,379 B2 | 2/2008 | Nihei et al. |
| 7,995,089 B2 * | 8/2011 | Pepe ............................. 347/261 |
| 2005/0089069 A1 | 4/2005 | Ozasa et al. |
| 2005/0219354 A1 | 10/2005 | Omori et al. |
| 2005/0243163 A1 | 11/2005 | Ozasa et al. |

(Continued)

FOREIGN PATENT DOCUMENTS

JP 04-321370 11/1992
JP 06-347712 12/1994

(Continued)

*Primary Examiner* — Laura Martin
*Assistant Examiner* — Jeremy Bishop
(74) *Attorney, Agent, or Firm* — Dickstein Shapiro LLP

(57) ABSTRACT

A deflector deflects a light beam emitted from a light source including a plurality of light-emitting units. A scanning optical system focuses the light beam deflected by the deflector on a scanning target surface. A monitoring photoreceiver receives a part of a light beam deflected by the deflector and directed toward an area within a scanning area outside an image area. A detecting unit individually detects emission powers of at least two light-emitting units based on an output signal of the monitoring photoreceiver in a single sweep of scanning.

6 Claims, 17 Drawing Sheets

U.S. PATENT DOCUMENTS

| | | |
|---|---|---|
| 2006/0209170 A1 | 9/2006 | Nihei |
| 2006/0285186 A1 | 12/2006 | Ishida et al. |
| 2007/0030548 A1 | 2/2007 | Nihei et al. |
| 2007/0091163 A1 | 4/2007 | Omori et al. |
| 2007/0126517 A1 | 6/2007 | Ozasa |
| 2007/0132828 A1* | 6/2007 | Ishida et al. ............ 347/233 |
| 2007/0206234 A1 | 9/2007 | Ozasa et al. |
| 2008/0088893 A1 | 4/2008 | Ishida et al. |
| 2008/0123160 A1 | 5/2008 | Omori et al. |
| 2008/0218813 A1 | 9/2008 | Tanabe et al. |
| 2008/0225106 A1 | 9/2008 | Omori et al. |
| 2008/0239336 A1 | 10/2008 | Tanabe et al. |
| 2008/0284838 A1 | 11/2008 | Suzuki et al. |
| 2008/0291259 A1 | 11/2008 | Nihei et al. |

FOREIGN PATENT DOCUMENTS

| | | |
|---|---|---|
| JP | 09-230259 | 9/1997 |
| JP | 9-288244 | 11/1997 |
| JP | 2001-257418 | 9/2001 |
| JP | 2002-40350 | 2/2002 |
| JP | 3343544 | 8/2002 |
| JP | 2003025626 A * | 1/2003 |
| JP | 2005-202042 | 7/2005 |
| JP | 3697707 | 7/2005 |
| JP | 2006-235088 | 9/2006 |
| JP | 2006-313917 | 11/2006 |
| JP | 2007-093774 | 4/2007 |
| JP | 2007-156259 | 6/2007 |

* cited by examiner

FIG. 20
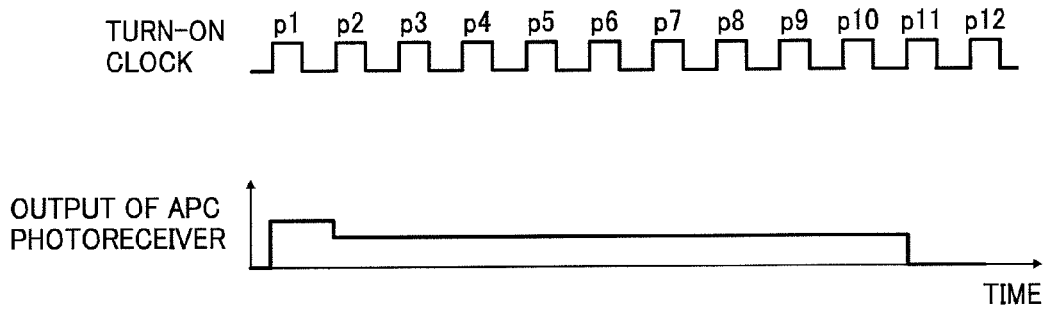
FIG. 21
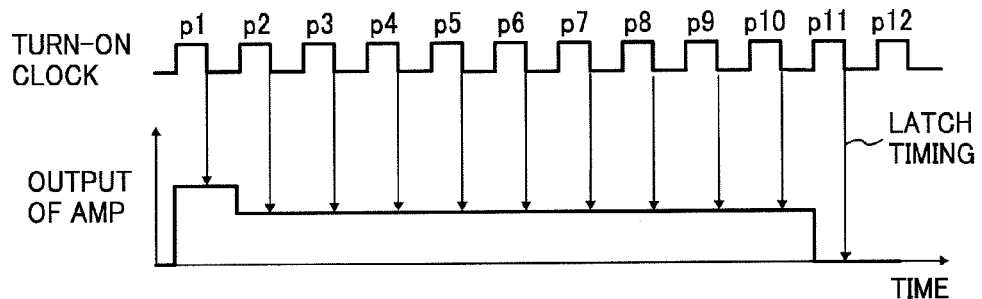
FIG. 22
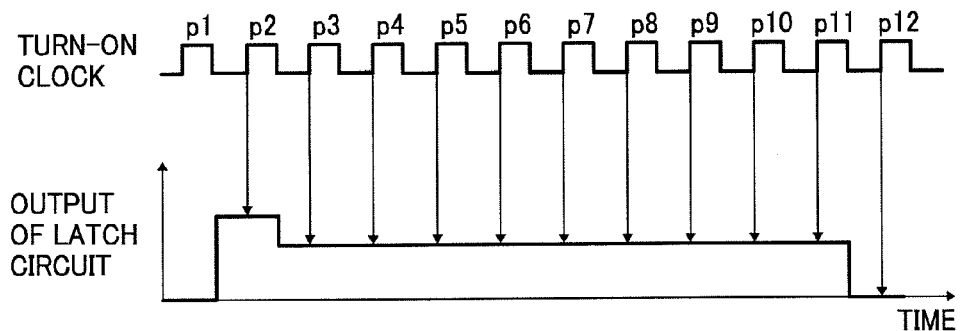
FIG. 23
| PATTERN | 1 | 2 | 3 | 4 | 5 | 6 | 7 | 8 | 9 |
|---|---|---|---|---|---|---|---|---|---|
| OFFSET LIGHT-EMITTING ELEMENT | v1 | v2 | v3 | v4 | v5 | v6 | v7 | v8 | v9 |

FIG. 26
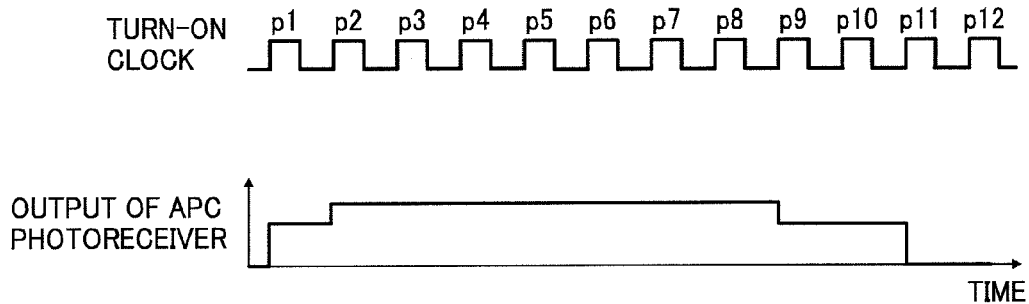
FIG. 27
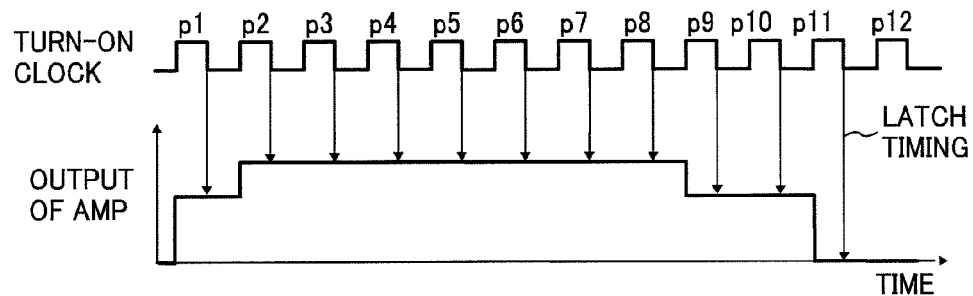
FIG. 28
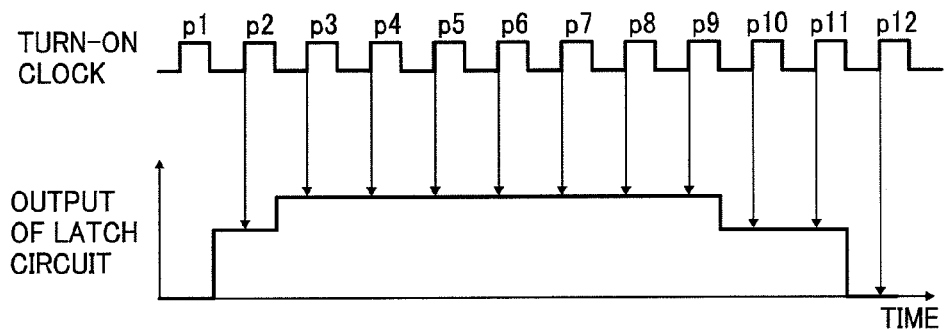
FIG. 29
| PATTERN | 1 | 2 | 3 | 4 | 5 | 6 | 7 | 8 | 9 |
|---|---|---|---|---|---|---|---|---|---|
| OFFSET LIGHT-EMITTING ELEMENT | v1 | v3 | v5 | v7 | v1 | v2 | v4 | v6 | v8 |
| | v2 | v4 | v6 | v8 | v9 | v3 | v5 | v7 | v9 |

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document 2008-025842 filed in Japan on Feb. 6, 2008.

BACKGROUND OF THE INVENTION

1. Field of the Invention

The present invention relates to an optical scanning device and an image forming apparatus, and more particularly, to an optical scanning device that scans a target surface with a light beam and an image forming apparatus including the optical scanning device.

2. Description of the Related Art

In recent years, improvements in a print speed (high speed) and a writing density (high density) have been required in an image forming apparatus, such as a laser printer and a digital copier. To achieve the improvements in the print speed and the writing density, in a conventional technology, an optical scanning device is employed which includes a light source having a plurality of light-emitting elements, and a scanning target surface is scanned with a plurality of light beams emitted from the light-emitting elements at one time.

A semiconductor laser has been generally used as a light source in an image forming apparatus. Although an edge-emitting laser was mainly used as the semiconductor laser, a vertical-cavity surface-emitting laser (VCSEL) has been recently used. Although the maximum number of light-emitting elements that can be arrayed in the edge-emitting laser is about four to eight, it is possible to array more than eight light-emitting elements in the VCSEL. Therefore, the VCSEL is expected to be the light source to achieve the high speed and the high density in the image forming apparatus.

If a light output of the light source fluctuates, a density variation occurs in an output image. Therefore, a conventional optical scanning device employing the edge-emitting laser monitors a light beam emitted from the edge-emitting laser in its backward direction, and performs an automatic power control (APC) thereby preventing the fluctuation of the light output. However, the surface-emitting laser does not emit a light beam in its backward direction because of its structure. Therefore, an optical scanning device employing the surface-emitting laser needs to control a light intensity of the light source in a manner different from the APC performed in the conventional technology.

For example, Japanese Patent Application Laid-open No. H9-288244, Japanese Patent Application Laid-open No. 2002-40350, and Japanese Patent Application Laid-open No. H4-321370 disclose a method of controlling a light intensity of a light source when a surface-emitting laser is employed in an optical scanning device. Specifically, a part of a light beam emitted from the surface-emitting laser is separated and guided to a photodetector by using optical elements, such as a beam splitter and a half mirror, and a drive current of the surface-emitting laser is controlled based on an output of the photodetector.

However, if the requirement of the high speed and the high density in the image forming apparatus becomes higher, it would be difficult for image forming apparatuses disclosed in the above Patent Documents to perform the APC with a sufficient accuracy and support the high speed and the high density. Furthermore, a conventional image forming apparatus has a problem that when the number of light-emitting elements included in a light source becomes larger, a time required for the APC is increased.

SUMMARY OF THE INVENTION

It is an object of the present invention to at least partially solve the problems in the conventional technology.

According to one aspect of the present invention, there is provided an optical scanning device that scans a scanning area on a scanning target surface with a light beam and writes image data in an image area within the scanning area. The optical scanning device includes a light source including a plurality of light-emitting units; a deflector that deflects a light beam emitted from the light source; a scanning optical system that focuses the light beam deflected by the deflector on the scanning target surface; a monitoring photoreceiver that receives a part of a light beam deflected by the deflector and directed toward an area within the scanning area outside the image area; and a detecting unit that individually detects emission powers of at least two light-emitting units based on an output signal of the monitoring photoreceiver in a single sweep of scanning.

Furthermore, according to another aspect of the present invention, there is provided an image forming apparatus including at least one image carrier; and at least one optical scanning device that scans a scanning area on a scanning target surface of the at least one image carrier with a light beam modulated by image data. The optical scanning device includes a light source including a plurality of light-emitting units, a deflector that deflects a light beam emitted from the light source, a scanning optical system that focuses the light beam deflected by the deflector on the scanning target surface, a monitoring photoreceiver that receives a part of a light beam deflected by the deflector and directed toward an area within the scanning area outside the image area, and a detecting unit that individually detects emission powers of at least two light-emitting units based on an output signal of the monitoring photoreceiver in a single sweep of scanning.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 19 to 22 are timing charts for explaining an example 2 of an APC when the light-receiving element shown in FIG. 12 is employed;

FIG. 23 is a table for explaining selection patterns of an offset light-emitting element in the example 2 of the APC;

FIGS. 25 to 28 are timing charts for explaining an example 4 of an APC when the light-receiving element shown in FIG. 12 is employed;

FIG. 29 is a table for explaining selection patterns of the offset light-emitting element in the example 4 of the APC;

DETAILED DESCRIPTION OF THE PREFERRED EMBODIMENTS

Exemplary embodiments of the present invention are explained in detail below with reference to the accompanying drawings.

Figure 1:
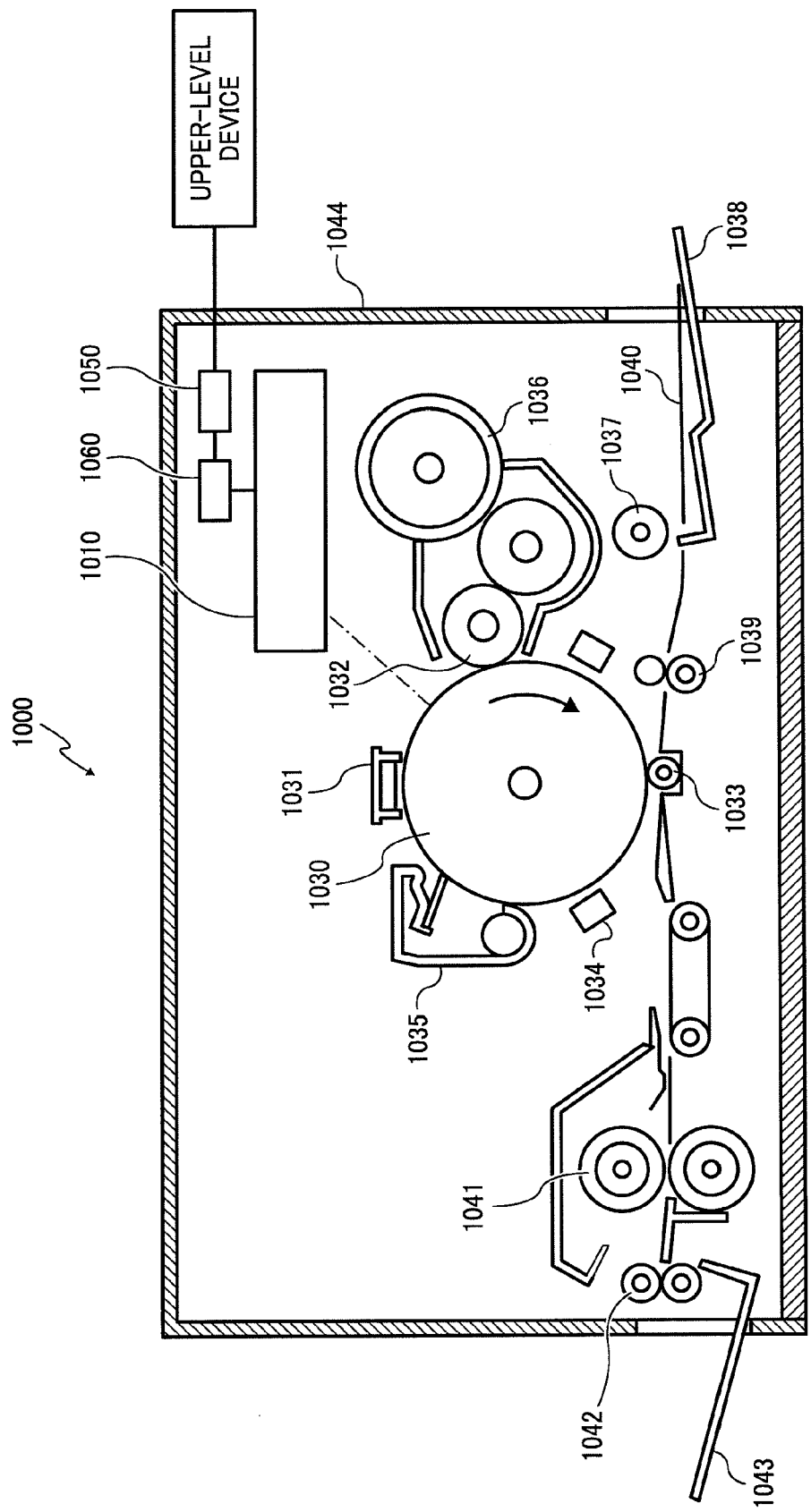
FIG. 1 is a schematic diagram of a laser printer according to an embodiment of the present invention.

FIG. 1 is a schematic diagram of a laser printer 1000 as an image forming apparatus according to an embodiment of the present invention.

The laser printer 1000 includes an optical scanning device 1010, a photosensitive element 1030, a charging unit 1031, a developing roller 1032, a transfer charging unit 1033, a neutralizing unit 1034, a cleaning unit 1035, a toner cartridge 1036, a feeding roller 1037, a feed tray 1038, a pair of registration rollers 1039, a fixing roller 1041, a pair of discharging rollers 1042, a catch tray 1043, a communication control device 1050, and a printer control device 1060 that controls the above components. Each of the above components is arranged at a predetermined position in a printer casing 1044.

The communication control device 1050 controls a bidirectional communication with an upper-level device, such as a personal computer (PC), via a network.

The photosensitive element 1030 is a cylindrical member, and has a photosensitive layer on its surface. Specifically, the surface of the photosensitive element 1030 is a scanning target surface. The photosensitive element 1030 is rotated in a direction indicated by an arrow shown in FIG. 1.

The charging unit 1031, the developing roller 1032, the transfer charging unit 1033, the neutralizing unit 1034, and the cleaning unit 1035 are arranged near the surface of the photosensitive element 1030 in this order along the rotation direction of the photosensitive element 1030.

The charging unit 1031 uniformly charges the surface of the photosensitive element 1030.

The optical scanning device 1010 causes the surface of the photosensitive element 1030 charged by the charging unit 1031 to be irradiated with a light beam that is modulated based on image data received from the upper-level device. Thus, a latent image corresponding to the image data is formed on the surface of the photosensitive element 1030. The latent image formed on the surface of the photosensitive element 1030 is then conveyed toward the developing roller 1032 with the rotation of the photosensitive element 1030. The configuration of the optical scanning device 1010 will be described later in detail.

The toner cartridge 1036 contains toner, and the toner is supplied from the toner cartridge 1036 to the developing roller 1032.

The developing roller 1032 then applies the toner to the latent image formed on the surface of the photosensitive element 1030 thereby developing the latent image. The latent image to which the toner is applied (hereinafter, referred to as "toner image" as appropriate for convenience of explanation) is conveyed toward the transfer charging unit 1033 with the rotation of the photosensitive element 1030.

The feed tray 1038 contains one or more recording sheets (hereinafter, "recording media") 1040. The feeding roller 1037 is arranged near the feed tray 1038. The feeding roller 1037 feeds one recording medium 1040 from the feed tray 1038 at a time, and conveys the fed recording medium 1040 to the registration rollers 1039. The registration rollers 1039 temporarily hold the recording medium 1040 fed by the feeding roller 1037, and convey the recording medium 1040 into a space between the photosensitive element 1030 and the transfer charging unit 1033 in accordance with the rotation of the photosensitive element 1030.

A voltage with a reverse polarity with respect to a polarity of the toner is applied to the transfer charging unit 1033, so that the toner on the surface of the photosensitive element 1030 is electrically attracted to the recording medium 1040. Thus, the toner image formed on the surface of the photosensitive element 1030 is transferred to the recording medium 1040. The recording medium 1040 with the toner image is then conveyed to the fixing roller 1041.

The fixing roller 1041 applies heat and pressure to the recording medium 1040, so that the toner is fixed to the recording medium 1040. The recording medium 1040 is then conveyed to the catch tray 1043 via the discharging rollers 1042, and is stacked on the catch tray 1043.

The neutralizing unit 1034 removes residual charges from the surface of the photosensitive element 1030.

The cleaning unit 1035 removes toner (residual toner) remaining on the surface of the photosensitive element 1030. The surface of the photosensitive element 1030 from which the residual toner is removed is conveyed again to a position at which the surface is arranged parallel to the charging unit 1031.

Figure 2:
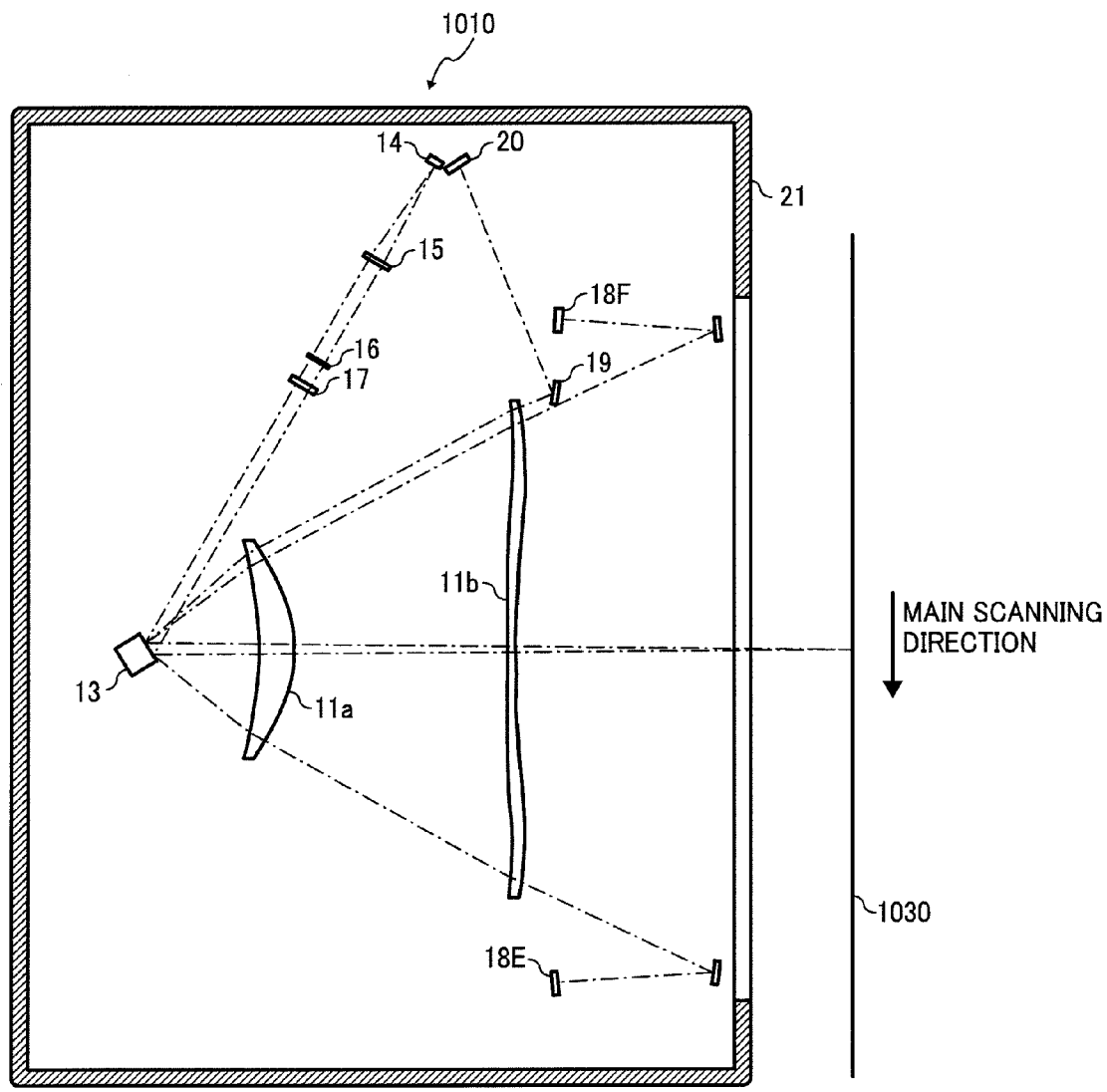
FIG. 2 is a schematic diagram of an optical scanning device shown in FIG. 1.
Figure 2:
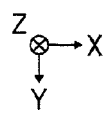

FIG. 2 is a schematic diagram of the optical scanning device 1010. The optical scanning device 1010 includes a scanning lens 11a on a deflector side, a scanning lens 11b on an image plane side, a polygon mirror 13, a light source 14, a coupling lens 15, an aperture plate 16, a cylindrical lens 17, a front-side synchronization detection sensor 18F, a rear-side synchronization detection sensor 18E, an APC mirror 19, an APC photoreceiver 20, and a scanning control device 22 (the scanning control device 22 is not shown in FIG. 2). Each of the above components is arranged at a predetermined position in a housing 21. In a three-dimensional orthogonal coordinate system having X, Y, and Z axes, a longitudinal direction of the photosensitive element 1030 is defined as an Y axial direction, and a direction along an optical axis of each of the scanning lenses 11a and 11b is defined as an X axial direction.

Figure 3:
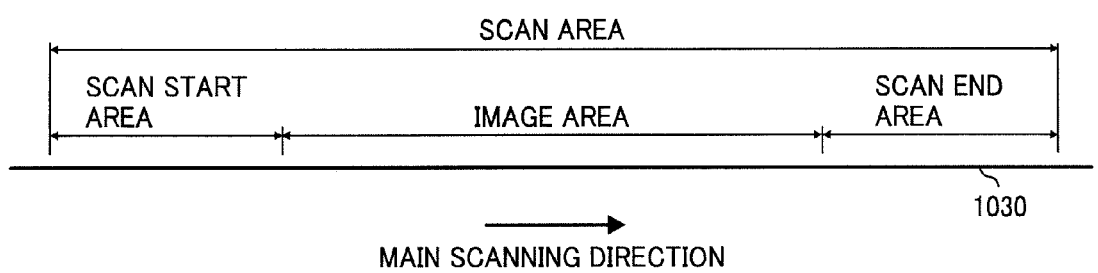
FIG. 3 is a diagram for explaining a scan start area, an image area, and a scan end area on a surface of a photosensitive element shown in FIG. 1.

FIG. 3 is a diagram for explaining a scan start area, an image area, and a scan end area on the surface of the photosensitive element 1030. An area on the surface of the photosensitive element 1030 to be scanned by the optical scanning device 1010 along the Y axial direction is referred to as a scanning area. An area that is located within the scanning area and in which image data is written is referred to as the image area. For convenience of explanation, an area that is located within the scanning area and is scanned prior to the image area is referred to as the scan start area, and an area that is located within the scanning area and is scanned after the image area is referred to as the scan end area.

Figure 4:
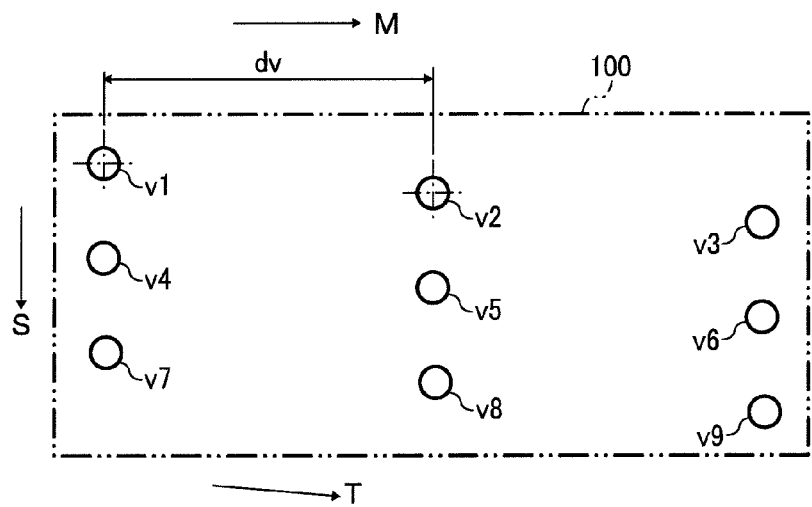
FIG. 4 is a schematic diagram for explaining a two-dimensional array included in a light source shown in FIG. 2.

FIG. 4 is a schematic diagram for explaining a two-dimensional array 100 included in the light source 14. The two-dimensional array 100 includes nine light-emitting elements that are arranged in a two-dimensional array on a board. A direction M shown in FIG. 4 corresponds to the main scanning direction, and a direction S shown in FIG. 4 corresponds to the sub-scanning direction (which corresponds to a Z axial direction shown in FIG. 2). A direction T extends with a tilt angle α (0°<α<90°) from the direction M toward the direction S.

The two-dimensional array 100 includes three lines of the light-emitting elements, each of the lines having three light-emitting elements arranged at equal spaces in the direction T. The light-emitting elements in the three lines are arranged at equal spaces in the direction S such that when all of the light-emitting elements are projected on imaginary lines in the direction S, projection images are arranged at equal spaces. For convenience of explanation, the top one of the three lines shown in FIG. 4 is referred to as a first line, the middle one of the three lines shown in FIG. 4 is referred to as a second line, and the bottom one of the three lines shown in FIG. 4 is referred to as a third line. A space between the light-emitting elements means a distance between the centers of the two light-emitting elements. A space dv between the light-emitting elements in the direction M is 100 μm.

For convenience of explanation, to specify each of the light-emitting elements, the three light-emitting elements, from the upper left to the lower right in FIG. 4, in the first line are referred to as light-emitting elements v1 to v3, the three light-emitting elements in the second line as light-emitting elements v4 to v6, and the three light-emitting elements in the third line as light-emitting elements v7 to v9.

Each of the light-emitting elements v1 to v9 is a VCSEL in a wavelength band of 780 nanometers. That is, the two-dimensional array 100 is a surface-emitting laser array.

Figure 5:
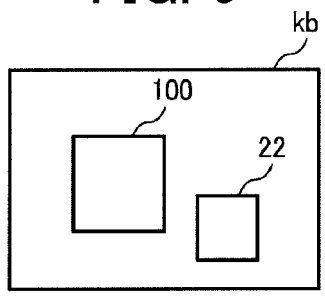
FIG. 5 is a schematic diagram of a circuit board on which the two-dimensional array is mounted.

FIG. 5 is a schematic diagram of a circuit board kb on which the two-dimensional array 100 is mounted. The scanning control device 22 is also mounted on the circuit board kb.

As shown in FIG. 2, the coupling lens 15 converts a light beam emitted from the light source 14 into a substantially parallel light beam.

The aperture plate 16 includes an aperture, and defines a beam diameter of the light beam passed through the coupling lens 15 in at least a direction corresponding to the sub-scanning direction (the Z axial direction). The light source 14 and the coupling lens 15 are fixedly mounted with the same supporting member made of aluminum.

The cylindrical lens 17 focuses the light beam passed through the aperture of the aperture plate 16 near a reflecting surface of the polygon mirror 13 in the direction corresponding to the sub-scanning direction (the Z axial direction).

An optical system arranged on an optical path between the light source 14 and the polygon mirror 13 is also called a pre-deflector optical system. The pre-deflector optical system includes the coupling lens 15, the aperture plate 16, and the cylindrical lens 17.

The polygon mirror 13 includes four mirrors each having an inscribed circle diameter of 7 millimeters, and each of the mirrors functions as the reflecting surface. The polygon mirror 13 deflects the light beam passed through the cylindrical lens 17 while being rotated at a constant speed around an axis parallel to the direction corresponding to the sub-scanning direction (the Z axial direction).

The scanning lens 11a is arranged on an optical path of the light beam deflected by the polygon mirror 13.

The scanning lens 11b is arranged on an optical path of the light beam passed through the scanning lens 11a. The surface of the photosensitive element 1030 is irradiated with the light beam passed through the scanning lens 11b whereby a light spot is formed on the surface of the photosensitive element 1030. The light spot is moved in the longitudinal direction of the photosensitive element 1030 in accordance with the rotation of the photosensitive element 1030. That is, the surface of the photosensitive element 1030 is scanned. A direction in which the light spot is moved is the main scanning direction.

An optical system arranged on an optical path between the polygon mirror 13 and the photosensitive element 1030 is also called a scanning optical system. The scanning optical system includes the scanning lenses 11a and 11b. A reflecting mirror that reflects the optical path can be arranged on at least either one of the optical path between the scanning lens 11a and the scanning lens 11b and the optical path between the scanning lens 11b and the photosensitive element 1030.

A part of the light beam that is deflected by the polygon mirror 13, passed through the scanning optical system, and directed toward the scan start area enters the APC photoreceiver 20 via the APC mirror 19 as a light beam used for monitoring (hereinafter, "monitoring light beam"). The APC photoreceiver 20 is arranged near the light source 14.

Figure 6:
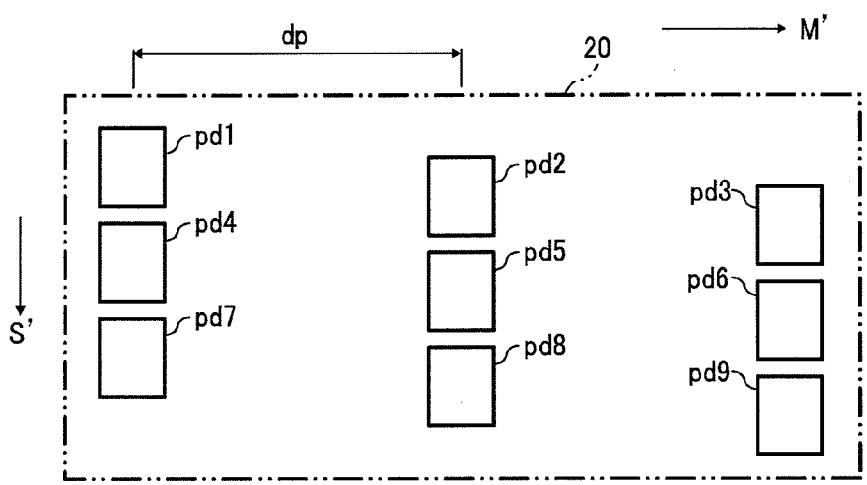
FIGS. 6 and 7 are schematic diagrams for explaining an automatic power control (APC) photoreceiver shown in FIG. 2.
Figure 7:
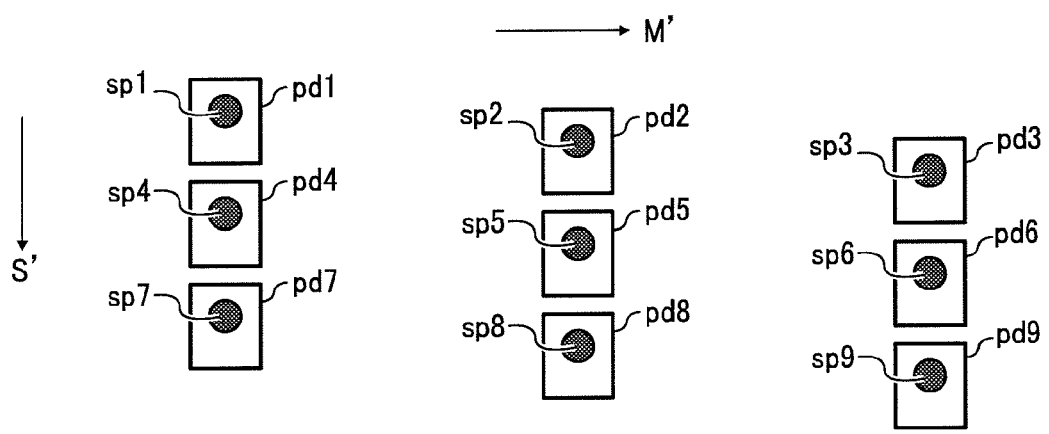

FIGS. 6 and 7 are schematic diagrams for explaining the APC photoreceiver 20. As shown in FIG. 6, the APC photoreceiver 20 includes nine light-receiving elements pd1 to pd9. A direction M' shown in FIG. 6 corresponds to the main scanning direction, and a direction S' shown in FIG. 6 corresponds to the sub-scanning direction (the Z axial direction). The light-receiving elements pd1 to pd9 are integrally formed. A magnification of the optical system in the main scanning direction is 10×, and a distance dp between the two light-receiving elements in the direction M' is 1000 μm.

As shown in FIG. 7, the light-receiving elements pd1 to pd9 correspond to the light-emitting elements v1 to v9, respectively, and the light-receiving elements pd1 to pd9 are arranged such that the light-receiving elements pd1 to pd9 receive light beams sp1 to sp9 emitted from the light-emitting elements v1 to v9, respectively. Each of the light-receiving elements pd1 to pd9 is of a size to receive only the light beam emitted from the corresponding one of the light-emitting elements v1 to v9.

Each of the light-receiving elements pd1 to pd9 outputs a signal (photoelectric conversion signal) depending on an amount of received light. An output signal from each of the light-receiving elements pd1 to pd9 is fed to the scanning control device 22.

A part of the light beam that is deflected by the polygon mirror 13, passed through the scanning optical system, and directed toward the scan start area enters the front-side synchronization detection sensor 18F via a mirror.

A part of the light beam that is deflected by the polygon mirror 13, passed through the scanning optical system, and directed toward the scan end area enters the rear-side synchronization detection sensor 18E via a mirror.

Each of the front-side synchronization detection sensor 18F and the rear-side synchronization detection sensor 18E outputs a signal (photoelectric conversion signal) depending on an amount of received light. An output signal from each of the front-side synchronization detection sensor 18F and the rear-side synchronization detection sensor 18E is fed to the scanning control device 22.

Figure 8:
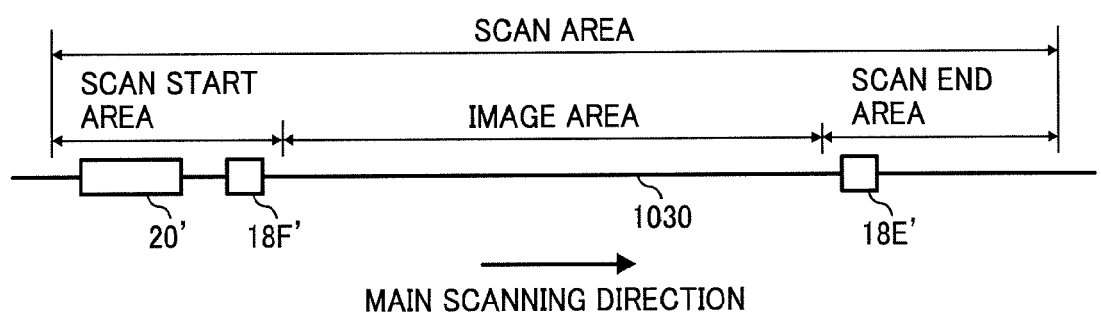
FIG. 8 is a schematic diagram for explaining equivalent positions of the APC photoreceiver, a front-side synchronization detection sensor, and a rear-side synchronization detection sensor near the photosensitive element in the optical scanning device.

FIG. 8 is a schematic diagram for explaining equivalent positions of the APC photoreceiver 20, the front-side synchronization detection sensor 18F, and the rear-side synchronization detection sensor 18E near the photosensitive element 1030. A reference numeral 20' shown in FIG. 8 denotes an equivalent position of the APC photoreceiver 20. A reference numeral 18F' shown in FIG. 8 denotes an equivalent position of the front-side synchronization detection sensor 18F. A reference numeral 18E' shown in FIG. 8 denotes an equivalent position of the rear-side synchronization detection sensor 18E. Specifically, the APC photoreceiver 20 is located closer to a scan start position than the front-side synchronization detection sensor 18F.

Figure 9:
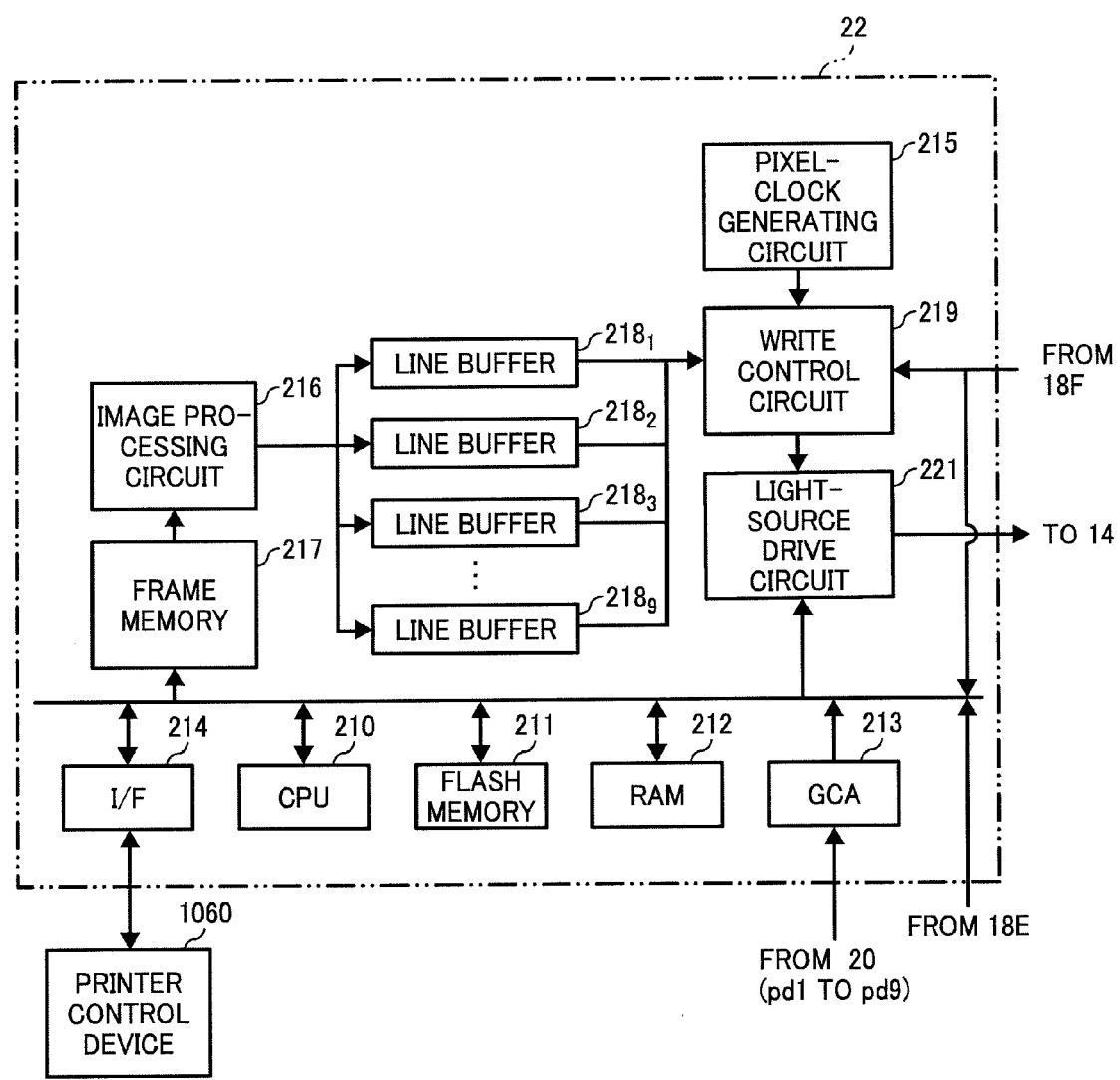
FIG. 9 is a block diagram for explaining the configuration of a scanning control device shown in FIG. 5.

FIG. 9 is a block diagram for explaining the configuration of the scanning control device 22. The scanning control device 22 includes a central processing unit (CPU) 210, a flash memory 211, a random access memory (RAM) 212, a gain control amplifier (GCA) 213, an interface (I/F) 214, a pixel-clock generating circuit 215, an image processing circuit 216, a frame memory 217, line buffers $218_1$ to $218_9$, a write control circuit 219, and a light-source drive circuit 221. Arrows shown in FIG. 9 indicate flows of representative signals and data, and do not indicate the entire connection relationships between the blocks.

The I/F 214 is a communication interface that controls a bidirectional communication with the printer control device 1060. Image data is fed from the upper-level device via the I/F 214.

The pixel-clock generating circuit 215 generates a pixel clock signal.

Image data (hereinafter, "raster data") that is rasterized by the CPU 210 is temporarily stored in the frame memory 217.

The image processing circuit 216 reads the raster data from the frame memory 217, performs a predetermined halftoning process, generates dot data for each of the light-emitting elements v1 to v9, and outputs the dot data to the line buffers $218_1$ to $218_9$ corresponding to the light-emitting elements v1 to v9.

The write control circuit 219 determines a timing at which a scanning operation is started based on an output signal from the front-side synchronization detection sensor 18F. The write control circuit 219 then reads the dot data for each of the light-emitting elements v1 to v9 from the line buffers $218_1$ to $218_9$ in accordance with the timing at which the scanning operation is started, superimposes the dot data on a pixel clock signal generated by the pixel-clock generating circuit 215, and generates data that is separately modulated for each of the light-emitting elements v1 to v9.

The light-source drive circuit 221 drives each of the light-emitting elements v1 to v9 depending on the modulated data from the write control circuit 219.

The GCA 213 receives output signals of the light-receiving elements pd1 to pd9, and performs a level adjustment on each of the output signals, so that an output deviation between the light-receiving elements pd1 to pd9 is reduced.

The flash memory 211 stores therein various computer programs that are written in codes readable by the CPU 210 and various data including emission properties of the light-emitting elements v1 to v9.

The RAM 212 is used as a working memory.

The CPU 210 operates in accordance with a computer program stored in the flash memory 211, and controls the optical scanning device 1010.

For example, the CPU 210 causes the light-emitting elements v1 to v9 to simultaneously emit light beams at each predetermined timing with an output signal from the rear-side synchronization detection sensor 18E as a synchronization signal, and individually detects emission powers of the light-emitting elements v1 to v9 based on output signals from the light-receiving elements pd1 to pd9 via the GCA 213. Relations between the output signals from the light-receiving elements pd1 to pd9 via the GCA 213 and the emission powers of the light-emitting elements v1 to v9 are acquired in advance, and stored in the flash memory 211.

The CPU 210 then controls a drive current of each of the light-emitting elements v1 to v9 via the light-source drive circuit 221 based on a detection result of the emission power of each of the light-emitting elements v1 to v9, so that the emission power of each of the light-emitting elements v1 to v9 becomes a desired level. Thus, the CPU 210 performs the APC.

Furthermore, the CPU 210 adjusts a pixel clock cycle based on output signals of the front-side synchronization detection sensor 18F and the rear-side synchronization detection sensor 18E, thereby obtaining a desired scanning length.

As described above, in the optical scanning device 1010, the light source 14 includes the nine light-emitting elements v1 to v9. The polygon mirror 13 deflects a light beam emitted from the light source 14. The scanning optical system focuses the light beam deflected by the polygon mirror 13 on the surface of the photosensitive element 1030. The APC photoreceiver 20 receives a part of the light beam that is deflected by the polygon mirror 13 and is projected onto the scan start area. The scanning control device 22 individually detects the emission powers of the light-emitting elements v1 to v9 based on an output signal from the APC photoreceiver 20, and controls the drive signal of each of the light-emitting elements v1 to v9 based on a detection result.

In the optical scanning device 1010, the APC photoreceiver 20 includes a monitoring photoreceiver. Moreover, the scanning control device 22 includes a detector and a control device.

At least a part of processes performed by the CPU 210 in accordance with computer programs can be constructed by hardware, or all of the processes can be constructed by hardware.

As described above, in the optical scanning device 1010, because a part of the light beam deflected by the polygon mirror 13 and directed toward the scan start area is used as the monitoring light beam, it is possible to obtain a larger amount of monitoring light beam than that in a conventional technology without decreasing a light use efficiency upon writing image data. Furthermore, because the APC photoreceiver 20 includes a plurality of light-receiving elements corresponding to a plurality of light-emitting elements, it is possible to detect fluctuation of a light intensity of each of the light-emitting elements in one scanning operation. The drive signals of the light-emitting elements can be individually and promptly controlled at the same timing whereby the fluctuation of the light intensities is reduced. That is, the APC can be performed with a higher speed and a higher accuracy than that in the conventional technology. Therefore, it is possible to scan the surface of the photosensitive element 1030 with a plurality of light beams in a stable manner.

Moreover, in the optical scanning device 1010, the monitoring light beam is reflected by the APC mirror 19, and received by the APC photoreceiver 20 arranged near the light source 14. With this configuration, a distance between the APC photoreceiver 20 and the scanning control device 22 can be short, so that signal delay can be reduced and the APC can be performed further promptly.

Furthermore, because the light-receiving elements pd1 to pd9 are integrally formed, it is possible to simplify an assembling operation and an adjustment operation of the APC photoreceiver 20.

Moreover, the optical scanning device 1010 includes the GCA 213 as a signal control device to reduce the output deviation between the light-receiving elements pd1 to pd9. Therefore, algorism for detecting the fluctuation of the light intensity can be simplified, and high-speed processing can be achieved.

Furthermore, the optical scanning device 1010 includes two synchronization detection sensors, i.e., the front-side synchronization detection sensor 18F and the rear-side synchronization detection sensor 18E. Therefore, the scanning length can be adjusted with a high accuracy. That is, an accuracy of a pixel position can be improved.

Furthermore, because the laser printer 1000 includes the optical scanning device 1010 that can scan the surface of the photosensitive element 1030 with a plurality of light beams in a stable manner, it is possible to form a high-density image at a high speed.

Figure 10:
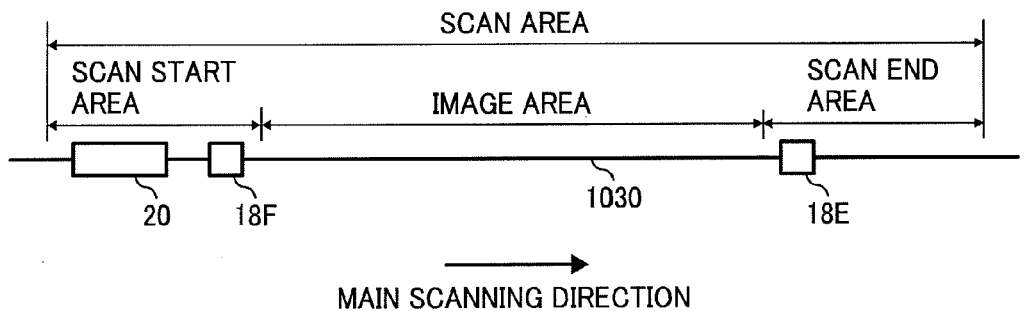
FIG. 10 is a schematic diagram for explaining a case where the APC photoreceiver, the front-side synchronization detection sensor, and the rear-side synchronization detection sensor are arranged near the photosensitive element.

FIG. 10 is a schematic diagram for explaining a case where the APC photoreceiver 20, the front-side synchronization detection sensor 18F, and the rear-side synchronization detection sensor 18E are arranged near the photosensitive element 1030. If the signal delay is not really acknowledged as a problem, the APC photoreceiver 20 can be arranged on the scan start area. In such a case, the APC mirror 19 does not need to be arranged. The front-side synchronization detection sensor 18F can be arranged on the scan start area. Moreover, the rear-side synchronization detection sensor 18E can be arranged on the scan end area.

Figure 11:
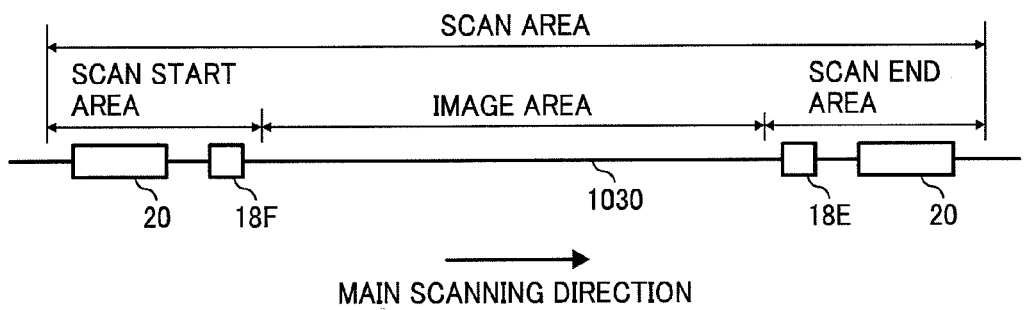
FIG. 11 is a schematic diagram for explaining a case where two APC photoreceivers are arranged.

FIG. 11 is a schematic diagram for explaining a case where two APC photoreceivers 20 are arranged. It is possible that the two APC photoreceivers 20 are arranged on the scan start area and the scan end area. In such a case, the detection accuracy of the emission power of each of the light-emitting elements v1 to v9 can be further improved by using output signals of the APC photoreceivers 20.

Although it is explained above that the two-dimensional array 100 includes the nine light-emitting elements v1 to v9, the present invention is not limited to this configuration.

Although it is explained above that the GCA 213 is arranged in the scanning control device 22, the present invention is not limited to this configuration. The GCA 213 can be arranged in the APC photoreceiver 20.

Figure 12:
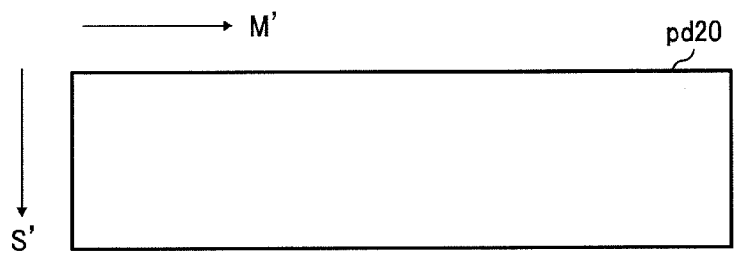
FIG. 12 is a schematic diagram of a light-receiving element according to a modification 1 of the APC photoreceiver.
Figure 13:
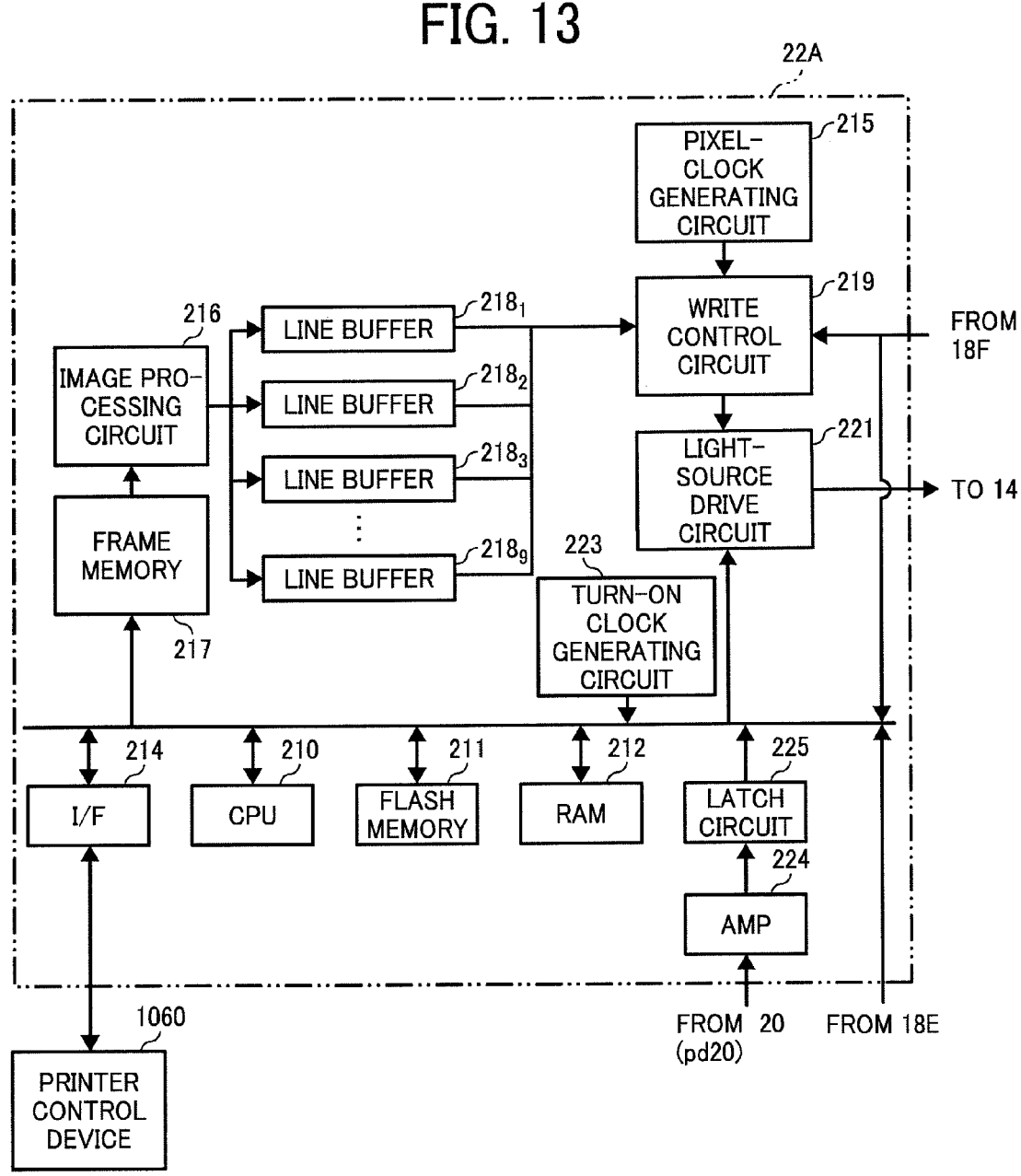
FIG. 13 is a block diagram for explaining the configuration of a scanning control device when the light-receiving element shown in FIG. 12 is employed.

FIG. 12 is a schematic diagram of a light-receiving element pd20 according to a modification 1 of the APC photoreceiver 20. FIG. 13 is a block diagram for explaining the configuration of a scanning control device 22A when the light-receiving element pd20 is employed. Although it is explained above that the APC photoreceiver 20 includes a plurality of light-receiving elements corresponding to a plurality of light-emitting elements, the present invention is not limited to this configuration. As shown in FIG. 12, the light-receiving element pd20 can be used instead of the light-receiving elements pd1 to pd9. The light-receiving element pd20 has a rectangle shape whose longitudinal direction extends along the direction M' corresponding to the main scanning direction. In this case, as shown in FIG. 13, the scanning control device 22A is used instead of the scanning control device 22. The scanning control device 22A includes the CPU 210, the flash memory 211, the RAM 212, the I/F 214, the pixel-clock generating circuit 215, the image processing circuit 216, the frame memory 217, the line buffers $218_1$ to $218_9$, the write control circuit 219, the light-source drive circuit 221, a turn-on clock generating circuit 223, an amplifier (AMP) 224, and a latch circuit 225.

Figure 14:
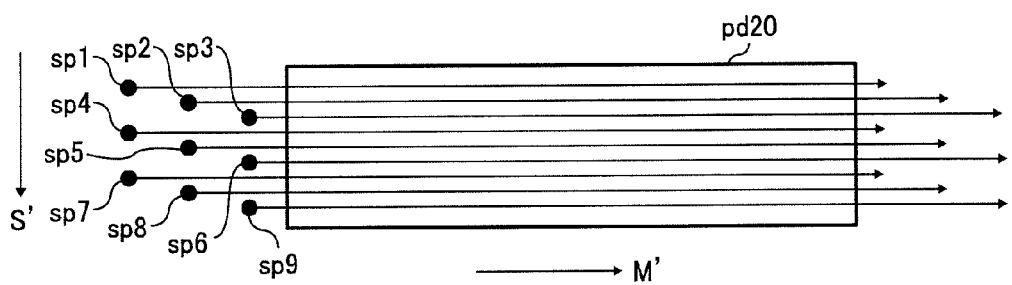
FIG. 14 is a schematic diagram for explaining a size of the light-receiving element shown in FIG. 12.

FIG. 14 is a schematic diagram for explaining the size of the light-receiving element pd20. The light-receiving element pd20 has a size in the direction S' corresponding to the sub-scanning direction such that it can simultaneously receive the light beams sp1 to sp9 emitted from the light-emitting elements v1 to v9.

Figure 15:
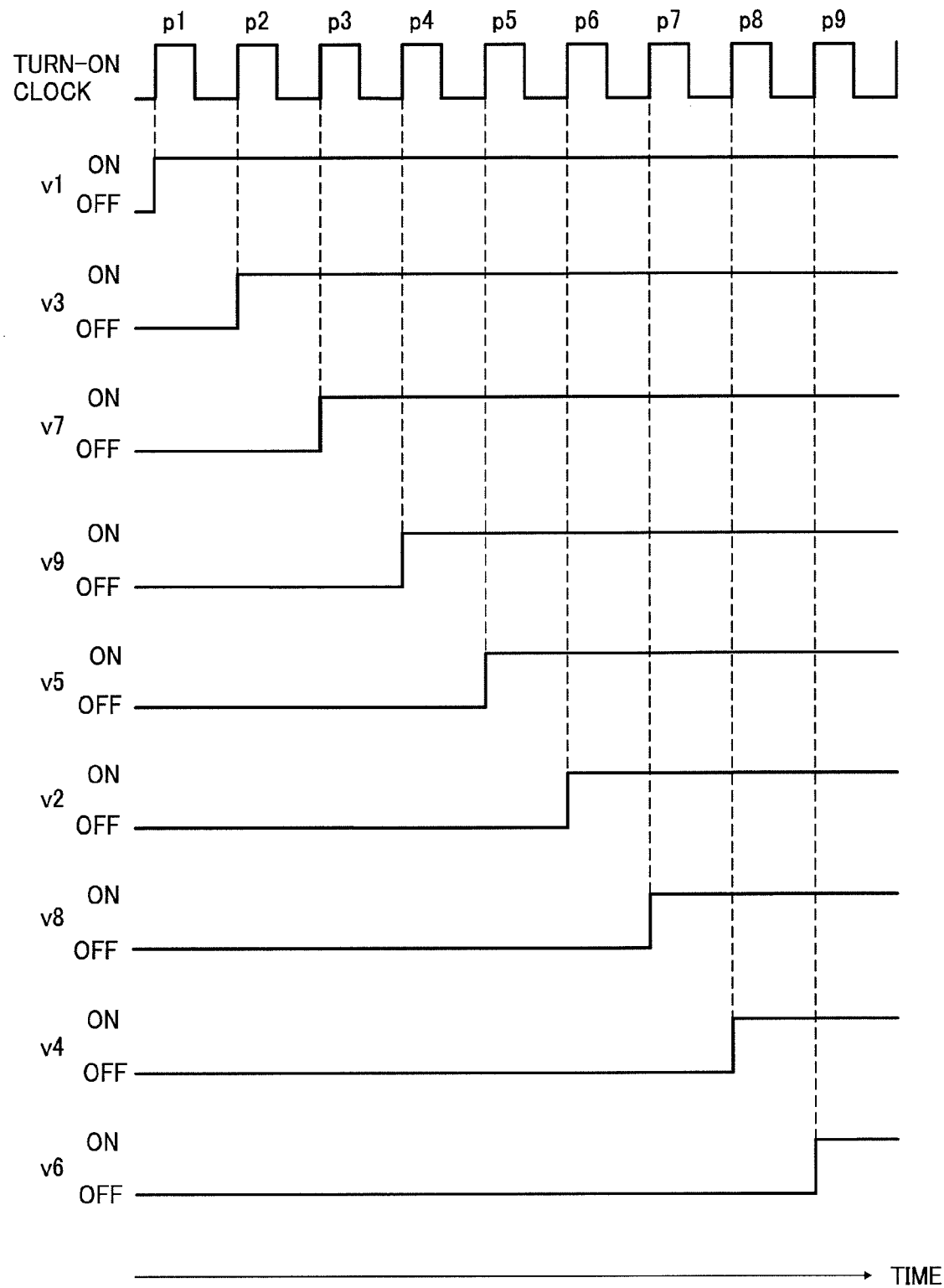
FIGS. 15 to 18 are timing charts for explaining an example 1 of an APC when the light-receiving element shown in FIG. 12 is employed.
Figure 16:
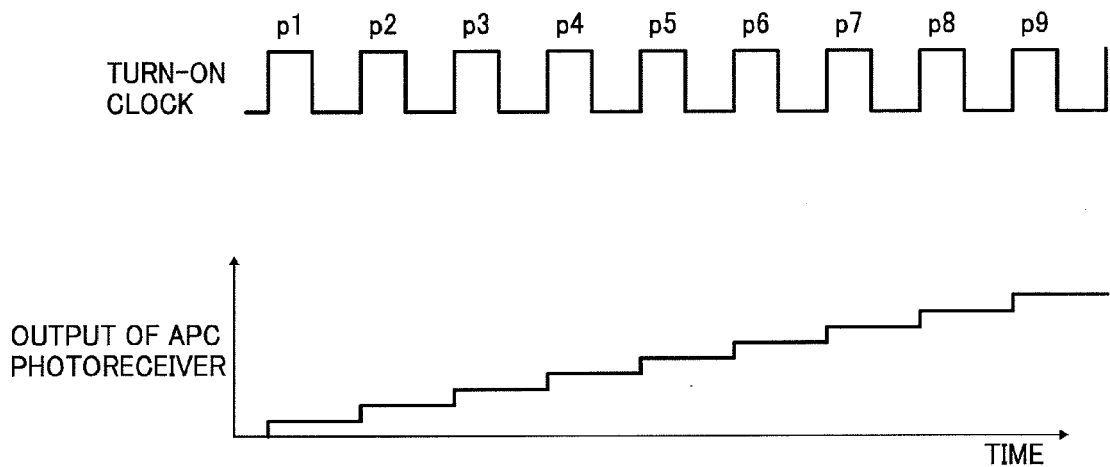
Figure 17:
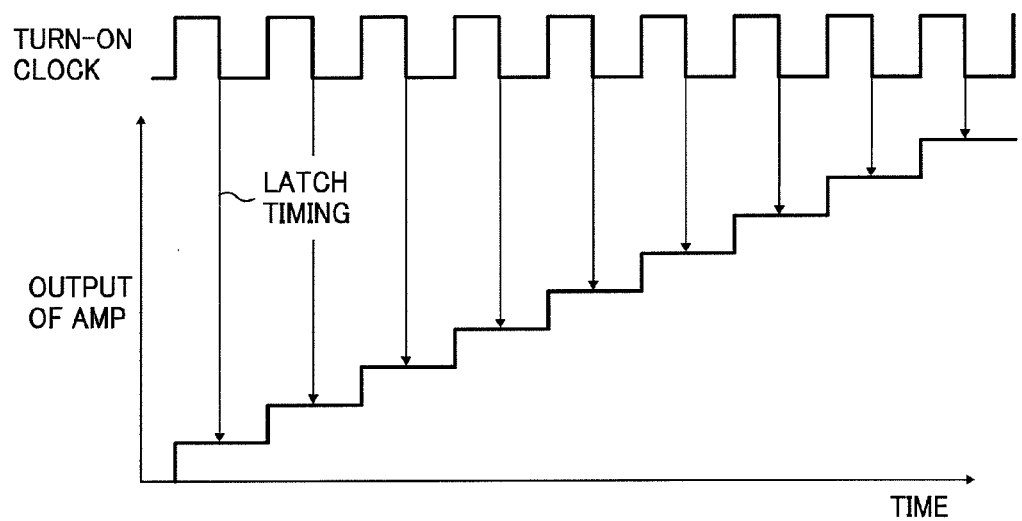
Figure 18:
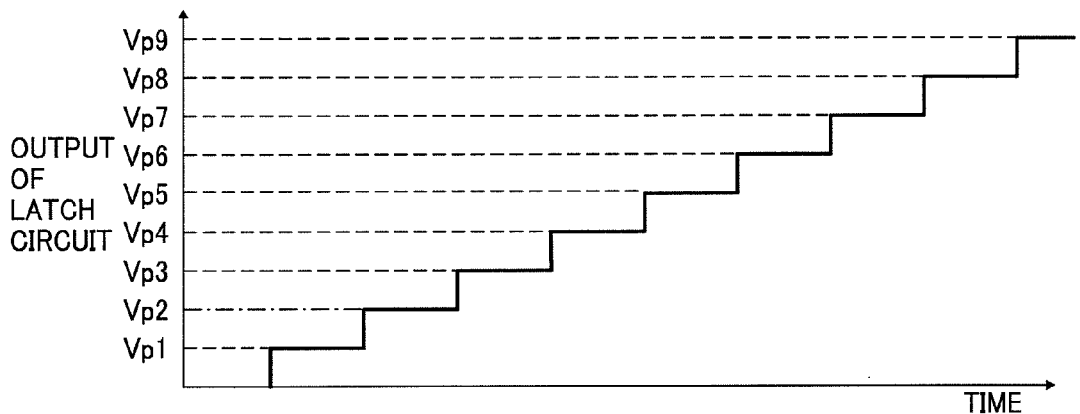

FIGS. 15 to 18 are timing charts for explaining an example 1 of the APC when the light-receiving element pd20 is employed. FIG. 15 is a timing chart for explaining turning on/off of each of the light-emitting elements v1 to v9. FIG. 16 is a timing chart for explaining outputs of the APC photoreceiver 20. FIG. 17 is a timing chart for explaining outputs of the AMP 224. FIG. 18 is a timing chart for explaining outputs of the latch circuit 225. As shown in FIG. 15, the CPU 210 of the scanning control device 22A causes the light-emitting elements v1 to v9 to be sequentially turned on one by one at a timing of a leading edge of a turn-on clock from the turn-on clock generating circuit 223. Specifically, the CPU 210 increases the number of light-emitting elements that are turned on by one. To reduce influence of thermal interference that can occur between the light-emitting elements v1 to v9, for example, the light-emitting elements v1 to v9 are turned on in the order of v1, v3, v7, v9, v5, v2, v8, v4, and v6.

As shown in FIG. 16, an output level of the APC photoreceiver 20 is increased in a stepwise manner. An output signal of the APC photoreceiver 20 is amplified by the AMP 224. The light-receiving element pd20 has a size in its longitudinal direction such that signals shown in FIG. 16 can be output in one scanning operation.

As shown in FIG. 17, the latch circuit 225 latches an output signal of the AMP 224 at a timing of a trailing edge of the turn-on clock.

The CPU 210 detects a light intensity of each of the light-emitting elements v1 to v9 based on an output signal of the latch circuit 225. As shown in FIG. 18, the light intensity of the light-emitting element v1 is detected based on Vp1, and the light intensity of the light-emitting element v3 is detected based on (Vp2-Vp1). Furthermore, the light intensity of the light-emitting element v7 is detected based on (Vp3-Vp2), and the light intensity of the light-emitting element v9 is detected based on (Vp4-Vp3). The light intensity of the light-emitting element v5 is detected based on (Vp5-Vp4), and the light intensity of the light-emitting element v2 is detected based on (Vp6-Vp5). The light intensity of the light-emitting element v8 is detected based on (Vp7-Vp6), and the light intensity of the light-emitting element v4 is detected based on (Vp8-Vp7). Then, the light intensity of the light-emitting element v6 is detected based on (Vp9-Vp8).

The CPU 210 individually detects the emission powers of the light-emitting elements v1 to v9 based on detection results of the light intensities of the light-emitting elements v1 to v9.

The CPU 210 controls a drive current of each of the light-emitting elements v1 to v9 via the light-source drive circuit 221, so that the emission power of each of the light-emitting elements v1 to v9 becomes a desired level.

In the above case, it is possible to individually detect the emission powers of all of the light-emitting elements v1 to v9 in one scanning operation, and performs the APC with a higher speed and a higher accuracy than that in the conventional technology.

When the APC photoreceiver 20 includes the light-receiving element pd20, if a large amount of offset signal component or noise component caused by the light-receiving element pd20 is contained in an output signal of the APC photoreceiver 20, it is possible that at least one of the light-emitting elements v1 to v9 is selected as an offset light-emitting element, and at least two target light-emitting elements for detection among the light-emitting elements v1 to v9 are turned on one by one together with the offset light-emitting element in one scanning operation whereby the emission powers of the two target light-emitting elements can be individually detected based on output signals of the APC photoreceiver 20. In this manner, it is possible to reduce influences of an offset signal and a noise caused by the light-receiving element pd20 on the output signal of the APC photoreceiver 20, and to improve a signal-to-noise ratio of the output signal of the APC photoreceiver 20.

Figure 19:
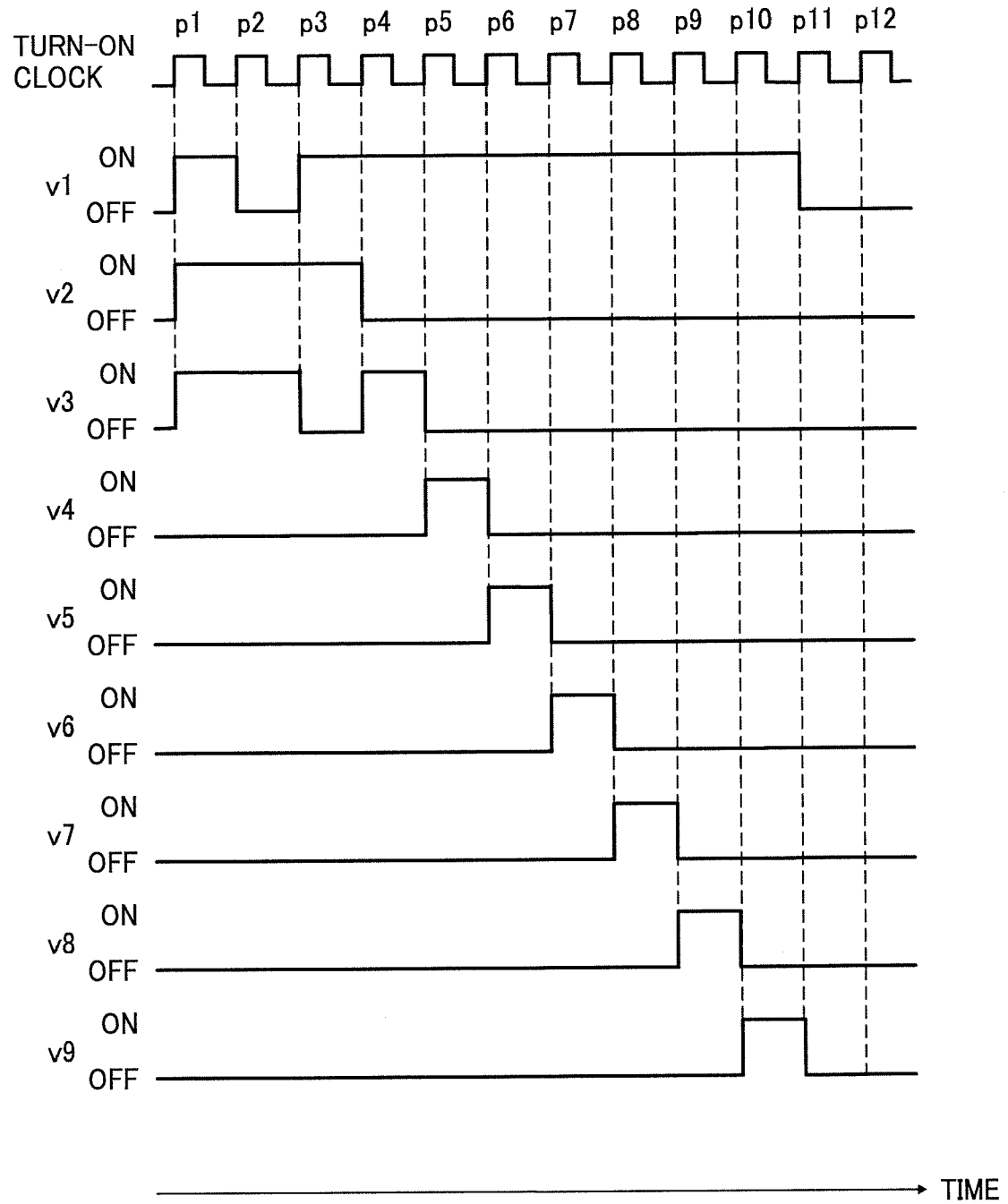

FIGS. 19 to 22 are timing charts for explaining an example 2 of the APC when the light-receiving element pd20 is employed and the light-emitting element v1 is selected as the offset light-emitting element. FIG. 19 is a timing chart for explaining turning on/off of each of the light-emitting elements v1 to v9. FIG. 20 is a timing chart for explaining outputs of the APC photoreceiver 20. FIG. 21 is a timing chart for explaining outputs of the AMP 224. FIG. 22 is a timing chart for explaining outputs of the latch circuit 225.

The CPU 210 of the scanning control device 22A causes the light-emitting elements v1, v2, and v3 to be turned on at a timing of a leading edge of a turn-on clock p1 from the turn-on clock generating circuit 223.

The CPU 210 then causes only the light-emitting element v1 to be turned off at a timing of a leading edge of a turn-on clock p2. The CPU 210 then detects the light intensity of the light-emitting element v1 based on a difference between an output of the latch circuit 225 when the light-emitting elements v1, v2, and v3 are turned on and an output of the latch circuit 225 when only the light-emitting element v1 is turned off.

The CPU 210 causes the light-emitting element v1 to be turned on at a timing of a leading edge of a turn-on clock p3, and causes the light-emitting element v3 to be turned off at the same timing. That is, the CPU 210 causes the light-emitting elements v1 and v2 to be turned on. The CPU 210 then determines the light intensity of the light-emitting element v2 by subtracting the detected light intensity of the light-emitting element v1 from the light intensity obtained from the output of the latch circuit 225 when the light-emitting elements v1 and v2 are turned on.

The CPU 210 then causes the light-emitting elements v3 to v9 to be sequentially turned on one by one at timings of leading edges of turn-on clocks p4 to p10 while causing the light-emitting element v1 to be turned on. The CPU 210 then determines the light intensity of each of the light-emitting elements v3 to v9 by subtracting the light intensity of the light-emitting element v1 from the light intensity obtained from the output of the latch circuit 225 when each of the light-emitting elements v3 to v9 is turned on.

FIG. 23 is a table for explaining selection patterns of the offset light-emitting element in the example 2 of the APC. The offset light-emitting element (pattern) can be changed over in every one scanning operation. Thus, it is possible to prevent the decrease in the life of the two-dimensional array 100.

Figure 24:
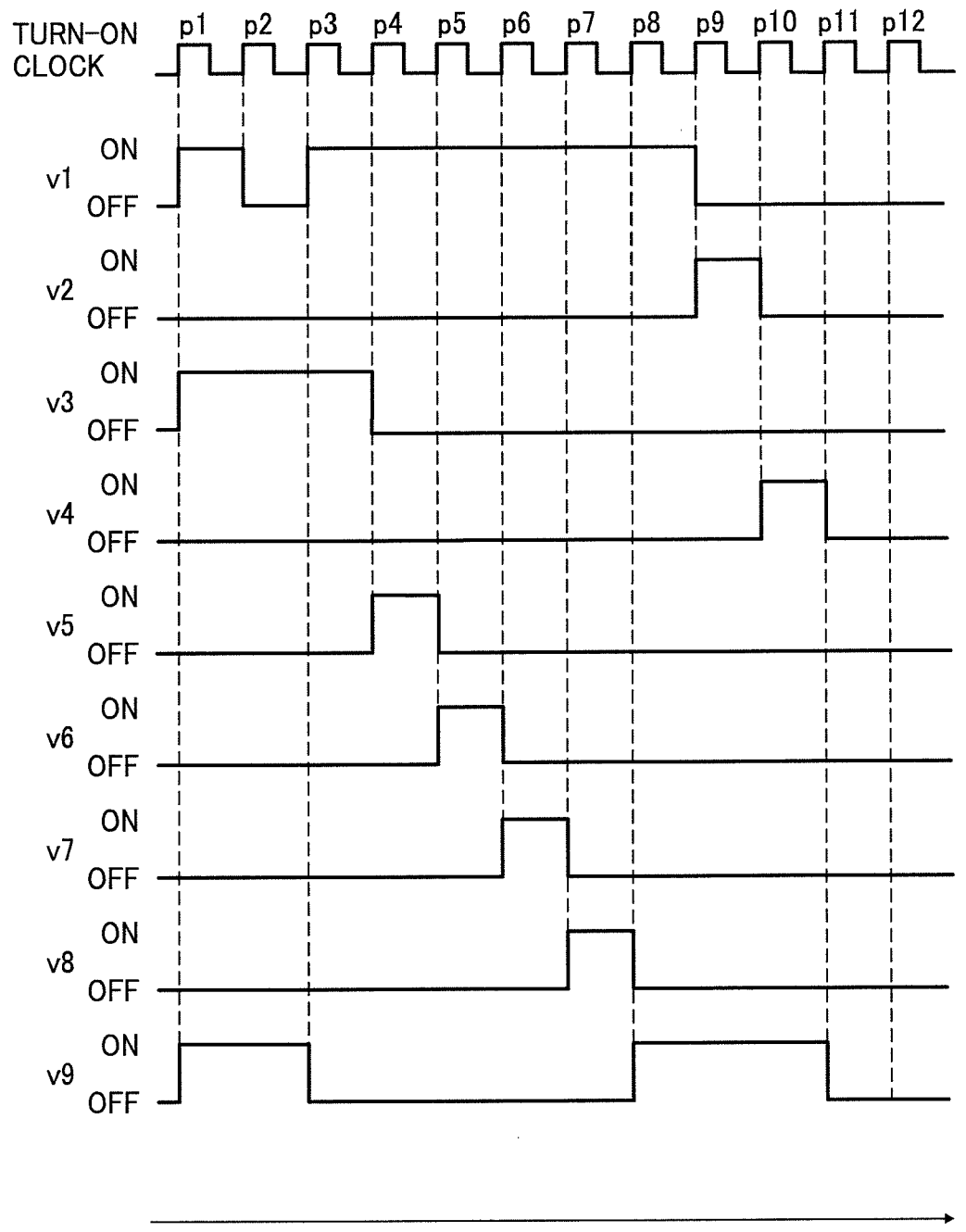
FIG. 24 is a timing chart for explaining an example 3 of an APC when the light-receiving element shown in FIG. 12 is employed.

Furthermore, the offset light-emitting element can be changed over during one scanning operation. In such a case, the offset light-emitting element can be changed over such that the offset light-emitting element is prevented from being adjacent to the target light-emitting elements. FIG. 24 is a timing chart for explaining an example 3 of the APC when the light-receiving element pd20 is employed. The light-emitting element v1 is selected as the offset light-emitting element when the light-emitting elements v3, v5 to v9 are the target light-emitting elements, and the light-emitting element v9 is selected as the offset light-emitting element when the light-emitting elements v2 and v4 are the target light-emitting elements. Thus, even if the distance between the light-emitting elements is small, it is possible to reduce the influence of heat caused by other light-emitting elements.

Figure 25:
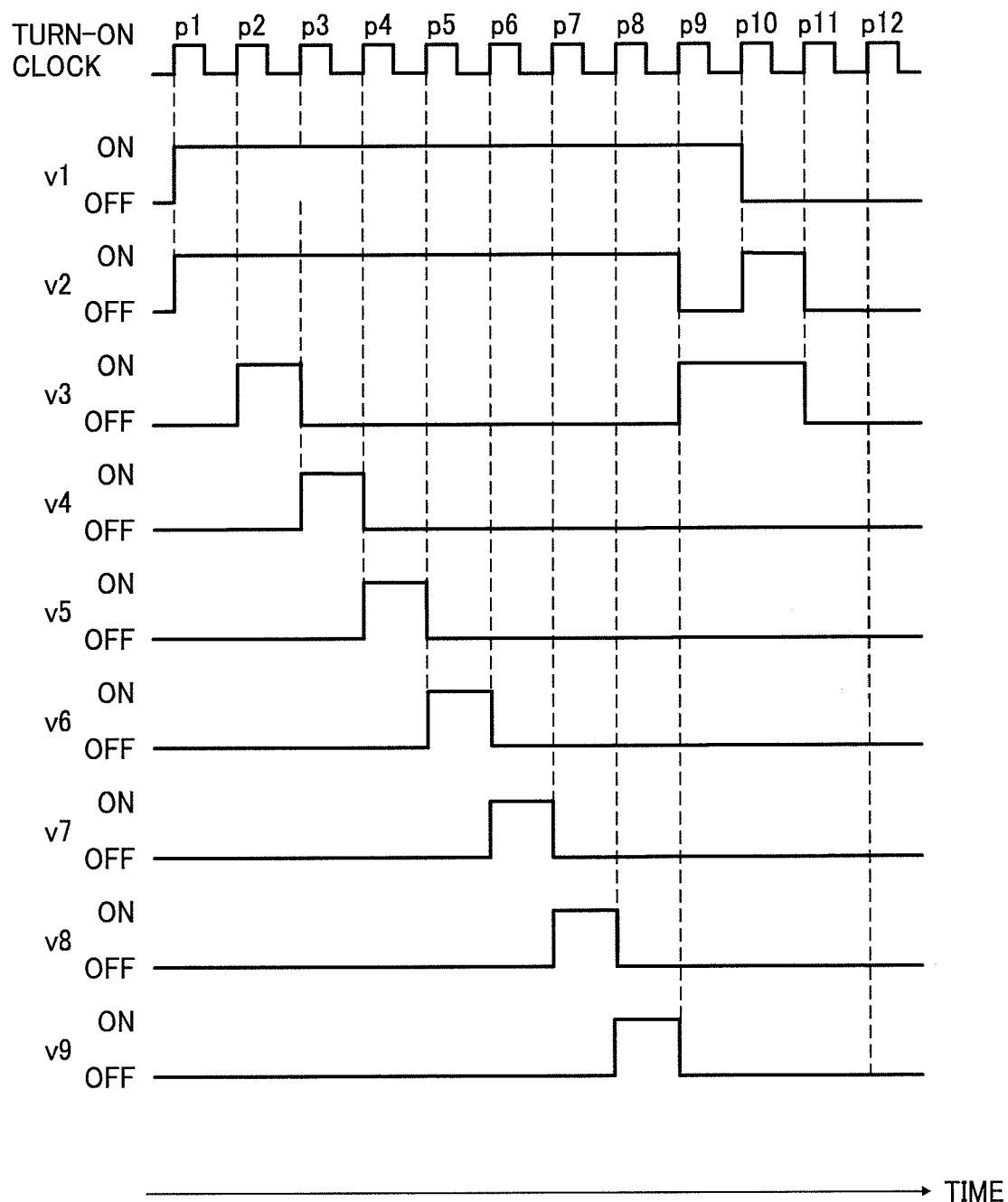
Figure 30:
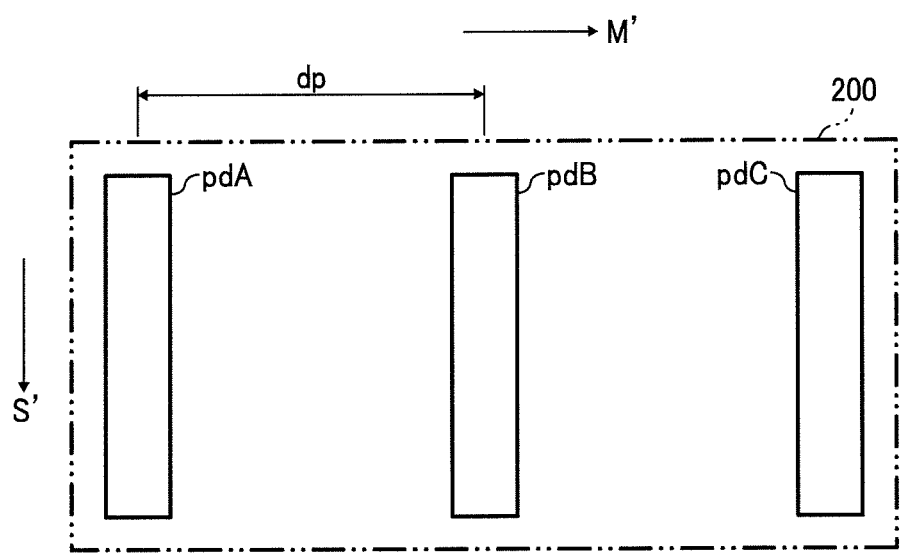
FIGS. 30 to 33 are schematic diagrams for explaining a light-receiving element according to a modification 2 of the APC photoreceiver.

FIGS. 25 to 28 are timing charts for explaining an example 4 of the APC when the light-receiving element pd20 is employed and the light-emitting elements v1 and v2 are selected as the offset light-emitting elements. FIG. 25 is a timing chart for explaining turning on/off of each of the light-emitting elements v1 to v9. FIG. 26 is a timing chart for explaining outputs of the APC photoreceiver 20. FIG. 27 is a timing chart for explaining outputs of the AMP 224. FIG. 28 is a timing chart for explaining outputs of the latch circuit 225.

The CPU 210 of the scanning control device 22A causes the light-emitting elements v1 and v2 to be turned on at a timing of the leading edge of the turn-on clock p1 from the turn-on clock generating circuit 223.

The CPU 210 then causes the light-emitting element v3 to be turned on at a timing of the leading edge of the turn-on clock p2. The CPU 210 detects the light intensity of the light-emitting element v3 based on a difference between an output of the latch circuit 225 when the light-emitting elements v1 and v2 are turned on and an output of the latch circuit 225 when the light-emitting elements v1 to v3 are turned on.

The CPU 210 then causes the light-emitting elements v4 to v9 to be sequentially turned on one by one at timings of the leading edges of the turn-on clocks p3 to p8 while causing the light-emitting elements v1 and v2 to be turned on. The CPU 210 then determines the light intensity of each of the light-emitting elements v4 to v9 based on a difference between an output of the latch circuit 225 when each of the light-emitting elements v4 to v9 is turned on and an output of the latch circuit 225 when only the light-emitting elements v1 and v2 are turned on.

The CPU 210 causes only the light-emitting elements v1 and v3 to be turned on at the timing of the leading edge of the turn-on clock p9, and detects the light intensity of the light-emitting elements v2 based on a difference between an output of the latch circuit 225 when the light-emitting elements v1 and v3 are turned on and an output of the latch circuit 225 when the light-emitting elements v1 to v3 are turned on.

The CPU 210 then causes only the light-emitting elements v2 and v3 to be turned on at the timing of the leading edge of the turn-on clock p10, and detects the light intensity of the light-emitting element v1 based on a difference between an output of the latch circuit 225 when the light-emitting elements v2 and v3 are turned on and an output of the latch circuit 225 when the light-emitting elements v1 to v3 are turned on.

FIG. 29 is a table for explaining selection patterns of the offset light-emitting elements in the example 4 of the APC. The offset light-emitting elements (patterns) can be changed over in every one scanning operation. Thus, it is possible to prevent the decrease in the life of the two-dimensional array 100.

Figure 31:
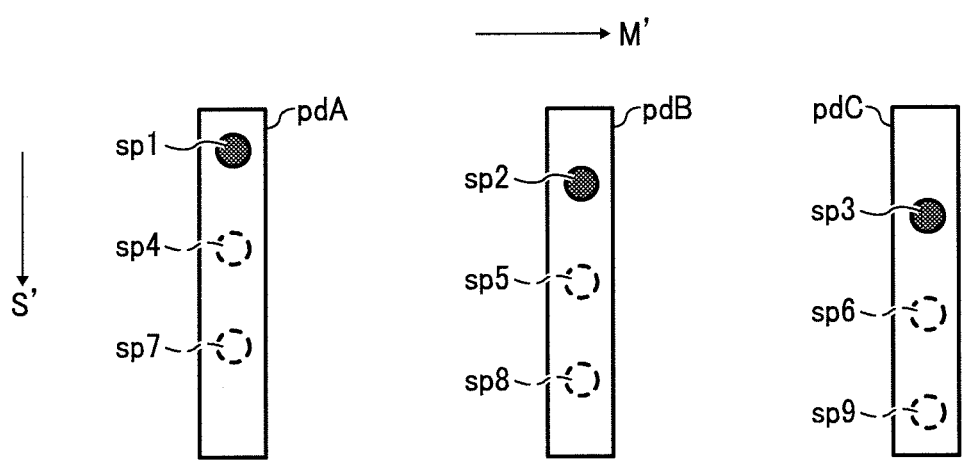
Figure 32:
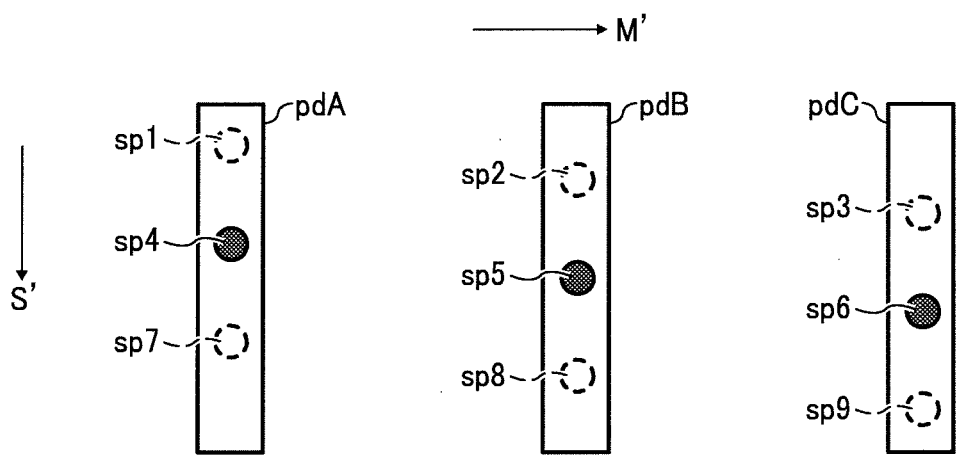
Figure 33:
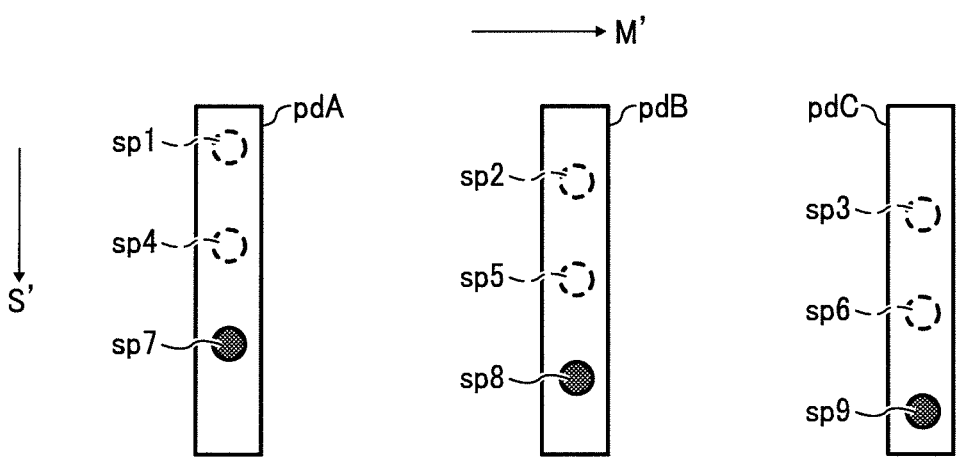

FIGS. 30 to 33 are schematic diagrams for explaining an APC photoreceiver 200 according to a modification 2 of the APC photoreceiver 20. The APC photoreceiver 200 includes three light-receiving elements pdA, dpB, and dpC instead of the light-receiving elements pd1 to pd9. As shown in FIGS. 31 to 33, the light-receiving element pdA can receive three light beams sp1, sp4, and sp7. The light-receiving element pdB can receive three light beams sp2, sp5, and sp8. The light-receiving element pdC can receive three light beams sp3, sp6, and sp9.

In this case, as shown in FIG. 31, the light-emitting elements v1, v2, and v3 are turned on in the first scanning operation. Then, the emission power of the light-emitting element v1 is detected based on an output signal of the light-receiving element pdA, the emission power of the light-emitting element v2 is detected based on an output signal of the light-receiving element pdB, and the emission power of the light-emitting element v3 is detected based on an output signal of the light-receiving element pdC.

As shown in FIG. 32, the light-emitting elements v4, v5, and v6 are turned on in the next scanning operation. Then, the emission power of the light-emitting element v4 is detected based on an output signal of the light-receiving element pdA, the emission power of the light-emitting element v5 is detected based on an output signal of the light-receiving element pdB, and the emission power of the light-emitting element v6 is detected based on an output signal of the light-receiving element pdC.

As shown in FIG. 33, the light-emitting elements v7, v8 and v9 are turned on in the next scanning operation. Then, the emission power of the light-emitting element v7 is detected based on an output signal of the light-receiving element pdA, the emission power of the light-emitting element v8 is detected based on an output signal of the light-receiving element pdB, and the emission power of the light-emitting element v9 is detected based on an output signal of the light-receiving element pdC.

Because the emission powers of the three light-emitting elements can be individually detected in one scanning operation, the emission powers of all of the light-emitting elements can be individually detected in the three scanning operations. In this case, the APC can be performed with a higher speed and a higher accuracy than that in the conventional technology.

Although it is explained in the above embodiment that the image forming apparatus is the laser printer 1000, the present invention is not limited to this configuration. It is possible to form a high-density image at a high speed if an image forming apparatus includes the optical scanning device 1010.

For example, it is possible to employ an image forming apparatus in which a medium (for example, a sheet) that develops an image with a laser beam is directly irradiated with a laser beam.

Moreover, it is possible to employ an image forming apparatus that uses a silver halide film as an image carrier. In such a case, a latent image is formed on the silver halide film by an optical scanning operation, and the latent image can be developed by an operation similar to a developing operation in a conventional silver halide photographic process. The developed image can be then transferred onto a photographic paper by an operation similar to a printing operation in the conventional silver halide photographic process. Such an image forming apparatus can be implemented as an optical press or an optical plotter that forms a computed tomography (CT) scan image or the like.

Figure 34:
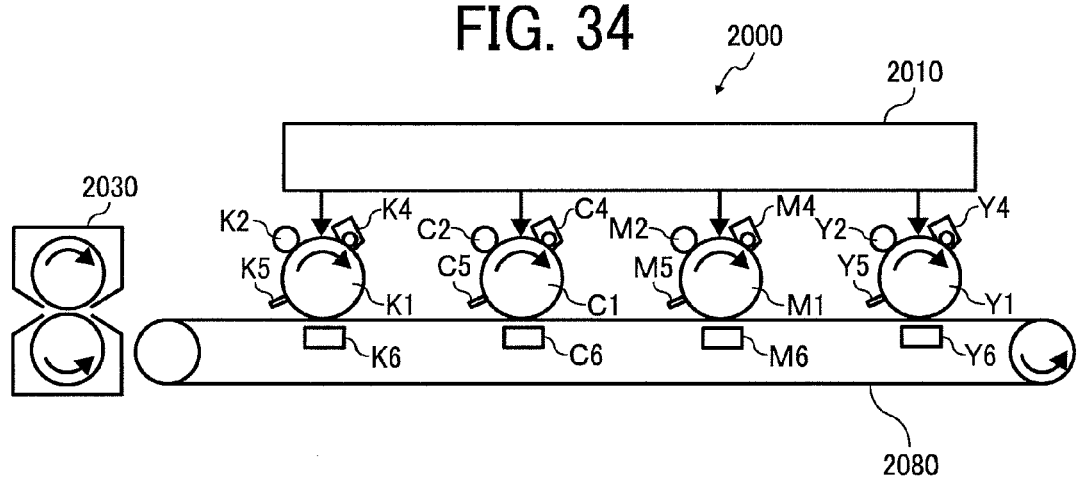
FIG. 34 is a schematic diagram of a color printer.

FIG. 34 is a schematic diagram of a color printer 2000 according to the embodiment. It is also possible to employ the color printer 2000 including a plurality of photosensitive elements.

The color printer 2000 is a tandem-type full-color printer that forms a full-color image by transferring four colors (cyan, magenta, black, and yellow) in a superimposed manner. The color printer 2000 includes photosensitive elements C1, M1, K1, Y1, charging devices C2, M2, K2, Y2, developing devices C4, M4, K4, Y4, cleaning units C5, M5, K5, Y5, transferring devices C6, M6, K6, Y6, an optical scanning device 2010, a transfer belt 2080, and a fixing unit 2030. The photosensitive elements C1, M1, K1, Y1, the charging devices C2, M2, K2, Y2, the developing devices C4, M4, K4, Y4, the cleaning units C5, M5, K5, Y5, and the transferring devices C6, M6, K6, Y6 correspond to cyan, magenta, black, and yellow.

Each of the photosensitive elements C1, M1, K1, and Y1 is rotated in a direction indicated by an arrow shown in FIG. 34. The charging devices C2, M2, K2, Y2, the developing devices C4, M4, K4, Y4, the transferring devices C6, M6, K6, Y6, and the cleaning units C5, M5, K5, Y5 are arranged around the photosensitive elements C1, M1, K1, Y1 in the order along the rotation direction of the photosensitive elements C1, M1, K1, Y1. Each of the charging devices C2, M2, K2, and Y2 uniformly charges the surface of the corresponding photosensitive element. The surface of the corresponding photosensitive element charged by each of the charging devices C2, M2, K2, and Y2 is irradiated with a light beam emitted from the optical scanning device 2010 whereby an electrostatic latent image is formed on the surface of the photosensitive element. The electrostatic latent image is then developed by the corresponding developing device, so that a toner image is formed on the surface of the photosensitive element. The toner images of the four colors are transferred onto a recording medium in a superimposed manner by the transferring devices C6, M6, K6, and Y6, and then the toner images are fixed to the recording medium by the fixing unit 2030.

The optical scanning device 2010 includes, for each of the four colors, a light source (not shown) similar to the light source 14, a APC photoreceiver (not shown) similar to the APC photoreceiver 20, a front-side synchronization detection sensor (not shown) similar to the front-side synchronization detection sensor 18F, a rear-side synchronization detection sensor (not shown) similar to the rear-side synchronization detection sensor 18E, and a scanning optical system (not shown) similar to the scanning optical system described above. In the following description, the same reference numerals are used to explain the same components as those in the optical scanning device 1010.

Figure 35:
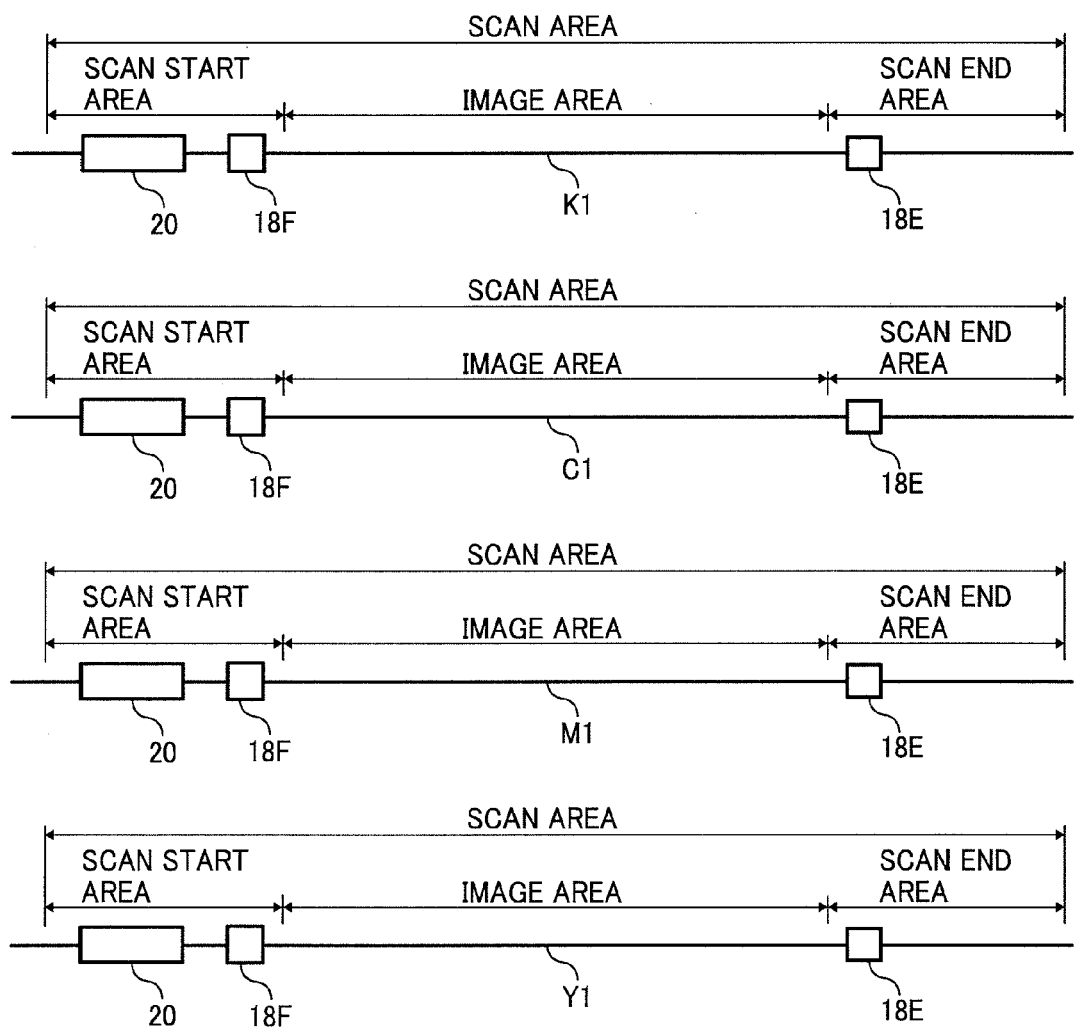
FIG. 35 is a schematic diagram for explaining arrangement positions of the APC photoreceiver, the front-side synchronization detection sensor, and the rear-side synchronization detection sensor in an optical scanning device shown in FIG. 34.

FIG. 35 is a schematic diagram for explaining arrangement positions of the APC photoreceiver 20, the front-side synchronization detection sensor 18F, and the rear-side synchronization detection sensor 18E in the optical scanning device 2010. The APC photoreceiver 20 and the front-side synchronization detection sensor 18F are arranged in the scan start area of each of the photosensitive elements C1, M1, K1, and Y1. Furthermore, the rear-side synchronization detection sensor 18E is arranged on the scan end area of each of the photosensitive elements C1, M1, K1, and Y1.

The photosensitive elements K1 is irradiated with a light beam emitted from the light source 14 corresponding to the block color via the scanning optical system corresponding to the block color. The photosensitive elements C1 is irradiated with a light beam emitted from the light source 14 corresponding to the cyan color via the scanning optical system corresponding to the cyan color. The photosensitive elements M1 is irradiated with a light beam emitted from the light source 14 corresponding to the magenta color via the scanning optical system corresponding to the magenta color. The photosensitive elements Y1 is irradiated with a light beam emitted from the light source 14 corresponding to the yellow color via the scanning optical system corresponding to the yellow color.

The APC photoreceiver 20 and the front-side synchronization detection sensor 18F each corresponding to the black color receive a part of the light beam that is emitted from the light source 14 corresponding to the black color and is directed toward the scan start area of the photosensitive element K1. The APC photoreceiver 20 and the front-side synchronization detection sensor 18F each corresponding to the cyan color receive a part of the light beam that is emitted from the light source 14 corresponding to the cyan color and is directed toward the scan start area of the photosensitive element C1. The APC photoreceiver 20 and the front-side synchronization detection sensor 18F each corresponding to the magenta color receive a part of the light beam that is emitted from the light source 14 corresponding to the magenta color and is directed toward the scan start area of the photosensitive element M1. The APC photoreceiver 20 and the front-side synchronization detection sensor 18F each corresponding to the yellow color receive a part of the light beam that is emitted from the light source 14 corresponding to the yellow color and is directed toward the scan start area of the photosensitive element Y1.

The rear-side synchronization detection sensor 18E corresponding to the black color receives a part of the light beam that is emitted from the light source 14 corresponding to the black color and is directed toward the scan end area of the photosensitive element K1. The rear-side synchronization detection sensor 18E corresponding to the cyan color receives a part of the light beam that is emitted from the light source 14 corresponding to the cyan color and is directed toward the scan end area of the photosensitive element C1. The rear-side synchronization detection sensor 18E corresponding to the magenta color receives a part of the light beam that is emitted from the light source 14 corresponding to the magenta color and is directed toward the scan end area of the photosensitive element M1. The rear-side synchronization detection sensor 18E corresponding to the yellow color receives a part of the light beam that is emitted from the light source 14 corresponding to the yellow color and is directed toward the scan end area of the photosensitive element Y1.

The optical scanning device 2010 performs the APC on the light source 14 for each of the four colors in the same manner as described in the above embodiment.

In this manner, the APC can be performed with a higher speed and a higher accuracy than that in the conventional technology. Thus, the color printer 2000 can form a high-density color image at a high speed.

The optical scanning device 1010 can be used in the color printer 2000 for each of the colors instead of the optical scanning device 2010.

According to one aspect of the present invention, the APC can be performed with a higher speed and a higher accuracy than that in the conventional technology.

Furthermore, according to another aspect of the present invention, a high-density image can be formed at a high speed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that scans a scanning area on a scanning target surface with a light beam and writes image data in an image area within the scanning area, the optical scanning device comprising:
    a light source including a plurality of light-emitting units;
    a deflector that deflects a light beam emitted from the light source;
    a scanning optical system that focuses the light beam deflected by the deflector on the scanning target surface;
    a monitoring photoreceiver that receives a part of a light beam deflected by the deflector and directed toward an area within the scanning area outside the image area; and
    a detecting unit that individually detects emission powers of at least two light-emitting units based on an output signal of the monitoring photoreceiver in a single sweep of scanning, and
    wherein the monitoring photoreceiver includes a single light-receiving unit, and the detecting unit sets at least one of the light-emitting units as an offset light-emitting unit, causes at least two light-emitting units from among the light-emitting units other than the offset light-emitting unit to be turned on one by one together with the offset light-emitting unit in a single sweep of scanning, and individually detects emission powers of the at least two target light-emitting units based on an output signal of the monitoring photoreceiver when the at least two target light-emitting units are turned on one by one together with the offset light-emitting unit and an output signal of the monitoring photoreceiver when the offset light-emitting unit alone is turned on.

2. The optical scanning device according to claim 1, wherein the offset light-emitting unit includes a single light-emitting unit.

3. The optical scanning device according to claim 1, wherein the offset light-emitting unit includes a plurality of light-emitting units.

4. The optical scanning device according to claim 1, wherein the detecting unit changes the offset light-emitting unit in every single sweep of scanning.

5. The optical scanning device according to claim 1, wherein the detecting unit changes the offset light-emitting unit within a single sweep of scanning.

6. The optical scanning device according to claim 5, wherein the detecting unit changes the offset light-emitting unit such that the offset light-emitting unit is prevented from being adjacent to a light-emitting unit of which the emitting power is detected.

* * * * *